United States Patent
Nguyen et al.

(10) Patent No.: US 9,165,547 B2
(45) Date of Patent: *Oct. 20, 2015

(54) LOCALIZATION OF A WIRELESS USER EQUIPMENT (UE) DEVICE BASED ON AUDIO MASKING

(71) Applicant: Research In Motion Limited, Waterloo (CA)

(72) Inventors: Nam Nguyen, Irving, TX (US); Sagar Dhakal, Irving, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 345 days.

This patent is subject to a terminal disclaimer.

(21) Appl. No.: 13/621,557

(22) Filed: Sep. 17, 2012

(65) Prior Publication Data

US 2014/0079223 A1  Mar. 20, 2014

(51) Int. Cl.
| | |
|---|---|
| *H04B 1/00* | (2006.01) |
| *H04R 3/02* | (2006.01) |
| *H04R 5/02* | (2006.01) |
| *G10K 11/00* | (2006.01) |
| *G01S 5/26* | (2006.01) |
| *G01S 5/30* | (2006.01) |
| *G10L 19/018* | (2013.01) |

(52) U.S. Cl.
CPC ............... *G10K 11/002* (2013.01); *G01S 5/26* (2013.01); *G01S 5/30* (2013.01); *G10L 19/018* (2013.01); *H04R 5/02* (2013.01)

(58) Field of Classification Search
None
See application file for complete search history.

(56) References Cited

U.S. PATENT DOCUMENTS

| | | | |
|---|---|---|---|
| 4,559,621 | A | 12/1985 | Delignieres |
| 5,491,670 | A | 2/1996 | Weber |
| 6,701,133 | B1 | 3/2004 | Bennett et al. |
| 7,640,028 | B2 | 12/2009 | Maheshwari et al. |

(Continued)

FOREIGN PATENT DOCUMENTS

| | | |
|---|---|---|
| EP | 1003239 | 5/2000 |
| EP | 2708910 A1 | 3/2014 |

(Continued)

OTHER PUBLICATIONS

Jimenez et al., "FPGA-based Implementation of an Ultrasonic Beacon for a Local Positioning System," IEEE Industrial Electronics, 6 pgs, Piscataway, NJ, USA, Nov. 1, 2006.

(Continued)

*Primary Examiner* — Regina N Holder
(74) *Attorney, Agent, or Firm* — Fish & Richardson P.C.

(57) ABSTRACT

A scheme for localizing a wireless user equipment (UE) device's relative position with respect to a spatial configuration based on audio signatures received via a multi-channel audio system, e.g., an audio system of a vehicle or home entertainment system. The wireless UE device is configured to capture the audio signatures masked within a background audio signal received from a head unit. The wireless UE device includes a persistent memory module having program instructions for processing the background audio signal including the masked signatures, which may comprise either channel-specific pseudo-random noise (PN) sequences or single-frequency tones, in order to compute time delays or power levels associated with the speaker channels. A localization module is configured to estimate the wireless UE device's relative position based on the time delays or power levels.

12 Claims, 12 Drawing Sheets

(56) References Cited

U.S. PATENT DOCUMENTS

| | | |
|---|---|---|
| 8,014,789 B2 | 9/2011 | Breed |
| 8,035,508 B2 | 10/2011 | Breed |
| 8,145,199 B2 | 3/2012 | Tadayon et al. |
| 8,265,001 B2 | 9/2012 | Lee |
| 8,867,313 B1 | 10/2014 | Rivlin et al. |
| 2004/0158401 A1 | 8/2004 | Yoon |
| 2005/0143141 A1 | 6/2005 | Ochi et al. |
| 2005/0181808 A1 | 8/2005 | Vaudreuil |
| 2005/0185627 A1 | 8/2005 | Bolgiano et al. |
| 2005/0232081 A1 | 10/2005 | Holm |
| 2006/0155508 A1 | 7/2006 | Choi |
| 2006/0160562 A1 | 7/2006 | Davis et al. |
| 2007/0072616 A1 | 3/2007 | Irani |
| 2007/0211786 A1 | 9/2007 | Shattil |
| 2009/0066539 A1 | 3/2009 | Uemura et al. |
| 2009/0149202 A1 | 6/2009 | Hill et al. |
| 2010/0248619 A1 | 9/2010 | Senarath et al. |
| 2011/0039581 A1 | 2/2011 | Cai et al. |
| 2011/0105097 A1 | 5/2011 | Tadayon et al. |
| 2011/0194407 A1 | 8/2011 | Ji et al. |
| 2011/0195699 A1 | 8/2011 | Tadayon et al. |
| 2011/0219080 A1 | 9/2011 | McWithey et al. |
| 2011/0237219 A1 | 9/2011 | Mendenhall et al. |
| 2012/0015625 A1 | 1/2012 | Mendenhall et al. |
| 2012/0039241 A1 | 2/2012 | Seo |
| 2012/0040665 A1 | 2/2012 | Liu et al. |
| 2012/0071151 A1 | 3/2012 | Abramson et al. |
| 2012/0149341 A1 | 6/2012 | Tadayon et al. |
| 2012/0161927 A1 | 6/2012 | Pierfelice et al. |
| 2014/0079224 A1 | 3/2014 | Nguyen et al. |
| 2014/0079242 A1 | 3/2014 | Nguyen et al. |

FOREIGN PATENT DOCUMENTS

| | | |
|---|---|---|
| EP | 2708911 A1 | 3/2014 |
| EP | 2708912 A1 | 3/2014 |
| WO | 01/34264 | 5/2001 |
| WO | 2011/050840 | 5/2011 |

OTHER PUBLICATIONS

Perez et al., "Ultrasonic beacon-based Local Positioning System using Loosely Synchronous codes," IEEE Intelligent Signal Processing, 6 pgs, Piscaaway, NJ, USA. Oct. 3, 2007.

EPO, Communication, U.S. Appl. No. 12/184,735, Feb. 5, 2013, 10 pgs.

EPO, Communication, U.S. Appl. No. 12/184,736, Feb. 7, 2013, 10 pgs.

EPO, Communication, U.S. Appl. No. 12/184,737, Feb. 20, 2013, 10 pgs.

Hon Lung Chu, In-Vehicle Driver Detection Using Mobile Phone Sensors, Apr. 2011, 21 pgs.

Janne Lindqvist & Jason Hong, Undistracted Driving: A Mobile Phone that Doesn't Distract, Mar. 2011, 6 pgs.

Jeanne Breen Consulting, Car Telephone Use and Road Safety, Jun. 2009, 21 pgs.

Jeffrey Shen, In-Vehicle Driver Detection Using Mobile Phone Sensors, Jun. 2011, 17 pgs.

Liane Yvkoff, New Tech Blocks Texting from Diver's Seat, The Car the Blog, CNET Reviews, Dec. 5, 2011.

Publication: Marie Stewart, Sensing Motion in a Mobile Phone and Limiting Functionalit of Moving Phones, Jun. 2010, 5 pgs.

Mitchell Bingemann, Sim Card Dashboard Brings Broadband to the Car, Australian IT, Feb. 19, 2010.

Nina Dragutinovic & Divera Twisk, Use of Mobile Phones While Driving—Effects on Road Safety, 2005, 57 pgs, R-005-12, SWOV, Leidschendam.

Shannon Noder, Talking and Texting While Driving: A Look at Regulating cell Phone Use Behind the Wheel, 44 Val. U. L. Rev. 237-282, Fall 2009.

World Health Organization, Mobile Phone Use: A Growing Problem of Driver Distraction, 2011, 54 pgs, WHO Press, Switzerland.

Yang et al., Detecting Driver Phone Use Leveraging car Speakers, ACM—MobiCom, Sep. 2011, 12 pgs.

Yang et al., Detecting Driver Phone Use Leveraging Car Speakers, Power Point Presentation, Sep. 2011, 29 pgs.

EPO, Notification of European Publication Number and Information on the Application of Article 67(3) EPC, Application No. 12184737.0, Feb. 19, 2014, 2 pgs.

EPO, Notification of European Publication Number and Information on the Application of Article 67(3) EPC, Application No. 12184736.2, Feb. 19, 2014, 2 pgs.

EPO, Notification of European Publication Number and Information on the Application of Article 67(3) EPC, Application No. 12184735.4, Feb. 19, 2014, 2 pgs.

USPTO, Notice of Publication of Application, U.S. Appl. No. 13/621,598, Mar. 20, 2014, 1 pg.

USPTO, Notice of Publication of Application, U.S. Appl. No. 13/621,639, Mar. 20, 2014, 1 pg.

EPO, Communication Pursuant to Rules 70(2) and 70a(2) EPC and Reference to Rule 39(1) EPC, Application No. 12184736.2, Mar. 24, 2014, 2 pgs.

EPO, Communication Pursuant to Rules 70(2) and 70a(2) EPC and Reference to Rule 39(1) EPC, Application No. 12184735.4, Mar. 24, 2014, 2 pgs.

USPTO, Office Action, U.S. Appl. No. 13/621,598, Feb. 18, 2015, 24 pages.

USPTO, Notice of Restrictions, U.S. Appl. No. 13/621,598, Nov. 19, 2014, 6 pgs.

USPTO, Office Action, U.S. Appl. No. 13/621,639, Nov. 19, 2014, 25 pgs.

LOCALIZATION OF A WIRELESS USER EQUIPMENT (UE) DEVICE BASED ON AUDIO MASKING

CROSS-REFERENCE TO RELATED APPLICATIONS

This application discloses subject matter that is related to the subject matter of the following U.S. patent application(s): (i) "LOCALIZATION OF A WIRELESS USER EQUIPMENT (UE) DEVICE BASED ON OUT-OF-HEARING BAND AUDIO SIGNATURES FOR RANGING", application Ser. No. 13/621,598, filed even date herewith in the name(s) of Nam Nguyen and Sagar Dhakal; and (ii) "LOCALIZATION OF A WIRELESS USER EQUIPMENT (UE) DEVICE BASED ON SINGLE BEEP PER CHANNEL SIGNATURES", application Ser. No. 13/621,639, filed even date herewith in the name(s) of Nam Nguyen and Sagar Dhakal; each of which is hereby incorporated by reference.

FIELD OF THE DISCLOSURE

The present patent disclosure generally relates to localization of a wireless user equipment (UE) device using audio ranging, wherein examples of a wireless UE device include mobile handheld devices such as pagers, cellular phones, personal digital assistants (PDAs), smartphones, wirelessly enabled portable computers, notepads, tablets, laptops, portable game consoles, remote game controllers, and the like. More particularly, and not by way of any limitation, the present patent disclosure is directed to one or more embodiments for localizing a wireless UE device's relative position with respect to a spatial configuration based on audio signatures received via an audio system.

BACKGROUND

Localizing where a wireless UE device is relative to its surroundings can be an important input to enable numerous safety and interface enhancements pertaining to its usage. For example, mobile phone use while driving is common, but many consider it to be hazardous. Some jurisdictions have regulated the use of mobile phones while driving, such as by enacting laws to prohibit handheld mobile phone use by a driver, but allow use of a mobile phone in hands-free mode.

BRIEF DESCRIPTION OF THE DRAWINGS

A more complete understanding of the embodiments of the present patent disclosure may be had by reference to the following Detailed Description when taken in conjunction with the accompanying drawings wherein.

DETAILED DESCRIPTION OF THE DRAWINGS

Figure 1:
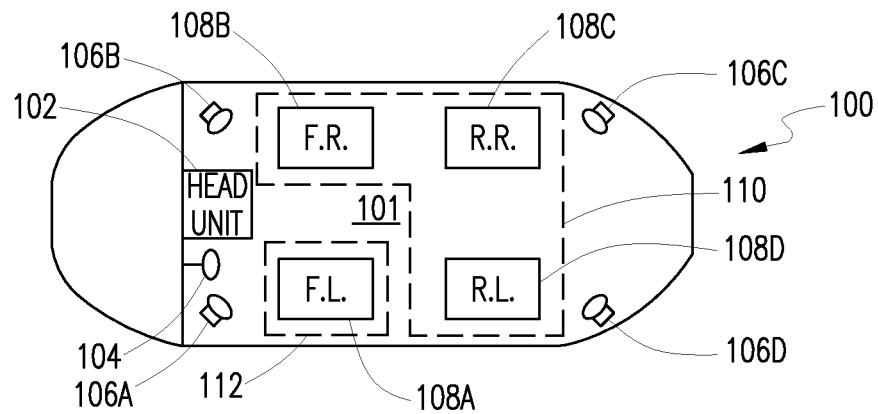
FIG. 1 depicts an illustrative example of a vehicular representation with associated vehicular spatial configuration wherein a wireless user equipment (UE) device may be localized in accordance with an embodiment of the present patent application.

The present patent disclosure is broadly directed to various systems, methods and apparatuses for effectuating localization of a wireless UE device relative to a spatial configuration using a number of audio ranging techniques. The present patent disclosure is also directed to associated computer-accessible media, computer programmable products and various software/firmware components relative to the audio ranging techniques set forth herein. Additionally, the present patent disclosure is further directed to selectively disabling, deactivating or otherwise modulating one or more features of a wireless UE device based on its localization relative to the spatial configuration in which it is placed, e.g., a vehicular or home theater configuration.

In one aspect, an embodiment of a method operating at a wireless UE device is disclosed which comprises: capturing a plurality of audio signatures received from a head unit via an audio transmission system having a plurality of speaker channels, wherein the plurality of audio signatures are masked within a background audio signal received from the head unit; and processing the plurality of audio signatures for determining the wireless UE device's location relative to a spatial configuration. Relatedly, also disclosed is a non-transitory computer-accessible medium having a sequence of instructions executable by a processing entity of a wireless UE device, wherein the sequence of instructions are configured to perform the acts set forth above.

In a related aspect, an embodiment of a wireless UE device is disclosed that includes: a processor configured to control one or more subsystems of the wireless UE device, such as, e.g., a microphone; and a persistent memory module having program instructions which, when executed by the processor, are configured to perform: facilitating capture of a plurality of audio signatures by the microphone received from a head unit via an audio transmission system having a plurality of speaker channels, wherein the plurality of audio signatures are masked within a background audio signal from the head unit; and processing the plurality of audio signatures for determining the wireless UE device's location relative to a spatial configuration.

In a further aspect, an embodiment of a head unit is disclosed that may be adapted for use in a particular spatial configuration such as, e.g., a vehicular space or a home theater/gaming system. The claimed embodiment comprises: a processor configured to control one or more subsystems of the head unit; a plurality of signal processing components corresponding to a plurality of speaker channels, each signal processing component configured to receive a background audio signal for a speaker channel and an audio signature for the speaker channel, wherein each signal processing component is further configured to mask the audio signature within the background audio signal; and an audio output component for facilitating transmission of the background audio signal including the masked audio signatures via the plurality of speaker channels.

In a still further related aspect, a non-transitory computer-accessible medium having a sequence of instructions executable by a processing entity of a head unit is disclosed. The claimed non-transitory computer-accessible medium comprises: a code portion configured for processing a background audio signal and an audio signature corresponding to a speaker channel of a plurality of speaker channels associated with the head unit, whereby the audio signature is masked within the background audio signal; and a code portion configured for facilitating transmission of the background audio signal including the masked audio signatures via the plurality of speaker channels.

In accordance with one implementation, the masked audio signatures set forth hereinabove may comprise one or more channel-specific pseudo-random noise (PN) sequences. The wireless UE device may include a persistent memory module having program instructions configured to perform: segmenting the background audio signal including masked PN sequences into a plurality of frames, each frame having a length; summing the plurality of frames to form a single combined frame; correlating the single combined frame with original PN sequences corresponding to the speaker channels to calculate a delay associated with each speaker channel, whereby a plurality of the delays are determined corresponding to the plurality of speaker channels; and estimating the wireless UE device's location based on the plurality of delays relative to the spatial configuration.

In accordance with another implementation, the masked audio signatures comprise may one or more channel-specific single-frequency tones. The wireless UE device may include a persistent memory module having program instructions configured to perform: segmenting the background audio signal including masked single-frequency tones into a plurality of frames, each frame having a length; summing the plurality of frames to form a single combined frame; performing a Fourier Transform analysis on the single combined frame and measure an energy level at each of the masked single-frequency tones; and estimating the wireless UE device's location based on the energy levels relative to the spatial configuration.

Accordingly, examples of audio signatures provided from a head unit may include PN sequences, single-frequency tones, beeps, and the like. In one or more example embodiments set forth herein, generally speaking, an element may be configured to perform a function if the element is capable of performing or otherwise structurally arranged to perform that function. Further, example spatial configurations may comprise a vehicular or home theater spatial configuration in which a wireless UE device may be placed and/or used.

Embodiments of systems, methods, apparatuses, and associated tangible computer-readable media having program instructions and computer program products relating to localization of a wireless UE device relative to a spatial configuration according to one or more techniques of the present patent disclosure will now be described with reference to various examples of how the embodiments can be made and used. Like reference numerals are used throughout the description and several views of the drawings to indicate like or corresponding parts to the extent feasible, wherein the various elements may not necessarily be drawn to scale. Referring now to the drawings, and more particularly to FIG. 1, depicted therein is an illustrative example of a vehicular representation 100 with associated vehicular spatial configuration 101 wherein a wireless user equipment (UE) device may be localized in accordance with at least one embodiment of the present patent application. For purposes of the present patent application, the terms "localization" or "localize" may refer to a methodology by which a relative position of the UE device with reference to a spatial configuration (e.g., such as a space associated with a vehicle or a game/home entertainment room, etc.) may be determined using one or more techniques disclosed herein. Further, a "wireless UE device" or a "UE device" may refer to a number of portable devices such as pagers, cellular phones, personal digital assistants (PDAs), smartphones, wirelessly enabled portable computers, notepads, tablets, laptops, portable game consoles, remote game controllers, navigation devices (such as global positioning system devices) and the like. Typically, such portable devices are handheld, that is, sized and shaped to be held and carried in a human hand, and often may be used while being held or carried. The terms "wireless. UE device" or a "UE device" may also be interchangeably used in the context of one or more embodiments of the present patent disclosure, mutatis mutandis.

The vehicular representation 100 having steering wheel 104 shown in FIG. 1 is illustrative of an automobile having four seating areas, such as, e.g., a driver area (also referred to as Front Left or FL area) 108A, a front passenger area (also referred to as Front Right or FR area) 108B, a first rear passenger area (also referred to as Rear Right or RR area) 108C, and a second rear passenger area (also referred to as Rear Left or RL area) 108D. In general, the vehicular representation 100 is representative of a vehicle where a spatial configuration associated therewith may be thought of as comprising a driver zone 112 and a non-driver zone 110 regardless of how many people it is designed to carry or whether it is a land vehicle or otherwise. It should therefore be appreciated that the vehicular representation 100 is strictly merely exemplary of any type of vehicle, make/model, seating configuration, and the like, and may include two-seaters, four-seaters, left-hand drive vehicles, right-hand drive vehicles, convertibles, multi-passenger vehicles, vans, sport utilities, pick-ups, buses, recreation vehicles (RVs), mobile homes, multi-axle trucks, trams, locomotives, two-wheelers (e.g., motorcycles), three-wheelers, etc., wherein a wireless UE device may be localized relative to a spatial configuration associated therewith using the embodiments of audio ranging techniques as will be described in detail hereinbelow. Furthermore, in addition to land vehicles, the vehicular representation 100 may also encompass aircraft as well as aquatic/marine craft that have a driver/pilot cabin or cockpit including an audio speaker system for purposes of the present patent application. Accordingly, it should be appreciated that an arbitrary segmentation of a vehicle's spatial configuration into driver and non-driver zones may be realized for the purpose of localizing a wireless UE device relative thereto and, additionally or optionally, modifying one or more functional capabilities of the wireless UE device depending on whether it is localized within the driver zone or the non-driver zone. One skilled in the art will therefore recognize that the shapes, sizes and 2- or 3-dimensional spaces associated with the driver and passenger areas may be variable depending on the vehicle type and may be configured or reconfigured based on specific implementation.

Regardless of the type of vehicle represented by the vehicular representation 100, a head unit 102 and associated audio transmission system are provided for purposes of the present application. As is known, a head unit (sometimes referred to as a "deck"), may be provided as a component of a vehicle or home entertainment system (e.g., home theater system integrated with a gaming system) which provides a unified hardware/software interface for various other components of an electronic media system. In the context of a typical automobile configuration, head unit 102 may be located in the center of the vehicle's dashboard and may also be coupled to the vehicle's alarm system and other dashboard instrumentation. In addition to facilitating user control over the vehicle's entertainment media (e.g., AM/FM radio, satellite radio, compact discs, DVDs, tapes, cartridges, MP3 media, onboard entertainment/gaming, GPS navigation, etc.), various vehicular functionalities and auxiliary instrumentation/sensory modules may therefore also be interfaced with the head unit's functionality, for providing inputs including, but not limited to, speedometer data, odometer data, tachometer data, engine data, fuel/gas gauge data, trip data, troubleshooting data, camera input, etc. Further, head unit 102 may also include Bluetooth connectivity, cellular telecommunications connectivity, Universal Serial Bus (USB) connectivity, secure digital (SD) card input, and the like, in addition to transmitting/receiving signals pertaining to location-based services either in conjunction with a wireless UE device localized within the vehicle or otherwise.

Head unit 102 may be coupled to a multi-channel audio system wherein a plurality of speaker channels may be provided for delivering multi-channel signals wirelessly or via wired means to corresponding speakers located at certain locations with respect to the vehicular spatial configuration 101. For example, a stereo system having two- or four-channels (or more channels) may be coupled to a suitable number of speakers for delivering music, news, or other sound. By way of illustration, speakers 106A and 106B represent front speakers and speakers 106C and 106D represent rear speakers in a four-channel audio transmission system. Multiple channels may be labeled as "left" channels or as "right" channels, or in some other combinations, wherein appropriate audio signature signals provided by the head unit 102 may be utilized for purposes of localization of a wireless UE device in accordance with one or more techniques described hereinbelow.

Figure 2:
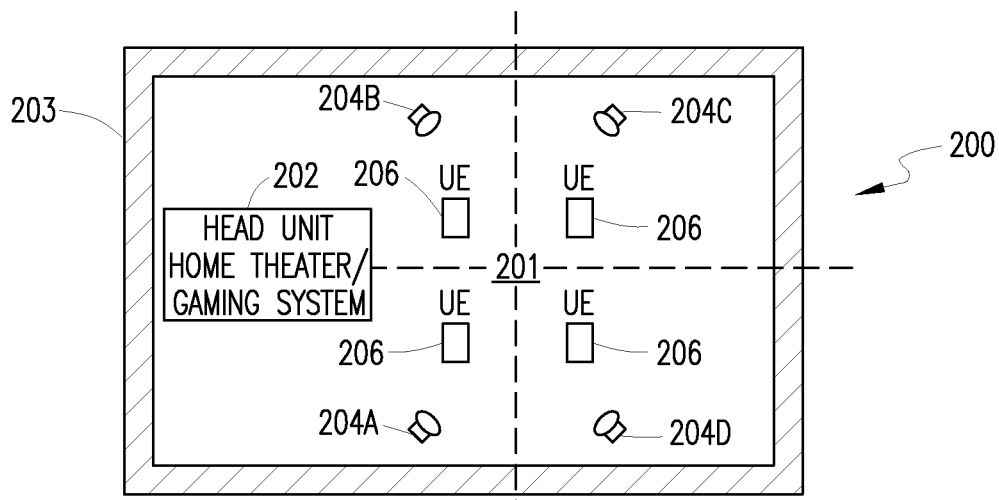
FIG. 2 depicts an illustrative example of a representation of a home entertainment/gaming system with associated spatial configuration wherein a wireless UE device (e.g., a game controller) may be localized in accordance with an embodiment of the present patent application.

FIG. 2 depicts an illustrative example of a representation 200 of a home entertainment/gaming system with associated spatial configuration 201 wherein a wireless UE device (e.g., a game controller) 206 may be localized in accordance with an embodiment of the present patent application. Similar to the vehicular head unit 102 described above, a head unit 202 may be provided to integrate the functionalities of various electronic media components as well as gaming system components located within a home media/game/entertainment room 203. As part of the entertainment/gaming system, a multi-channel audio system may be included for providing sound signals to a plurality of speakers located at specific locations within the spatial configuration 201. By way of illustration, speakers 204A-204D represent four speakers associated with a multi-channel audio system associated with the head unit 202. Speakers 204A-204D may receive suitable audio signature signals (preconfigured or otherwise) provided by the head unit 202, wirelessly or by wired means, wherein the spatial configuration 201 may be segmented into a number of regions or zones, (e.g., quadrants) for purposes of localizing the UE device, i.e., game controller 206, relative thereto and appropriately modifying its behavior in response.

It should be appreciated that in both vehicular and home entertainment spatial configuration scenarios, localization of a wireless UE device broadly involves the following features, inter alia: capturing by the wireless UE device a plurality of audio signatures transmitted from a head unit via an audio transmission system having a plurality of speaker channels; and processing the plurality of audio signatures for determining (i.e., configured to determine or suitable for determining or adapted to determine or otherwise capable of performing the function of determining) the wireless UE device's location relative to a spatial configuration associated with the wireless UE device (i.e., relative ranging and localization processing). In one embodiment, part of relative ranging and localization processing may involve utilization of speaker location information (i.e., speaker configuration), which may be provided to the wireless UE device dynamically from the head unit, or entered by the user when localization is desired, or may be preconfigured into the UE device for a class/type of vehicles, makes or models, for example, as will be set forth below in greater detail in reference to FIGS. 19 and 20.

Figure 3:
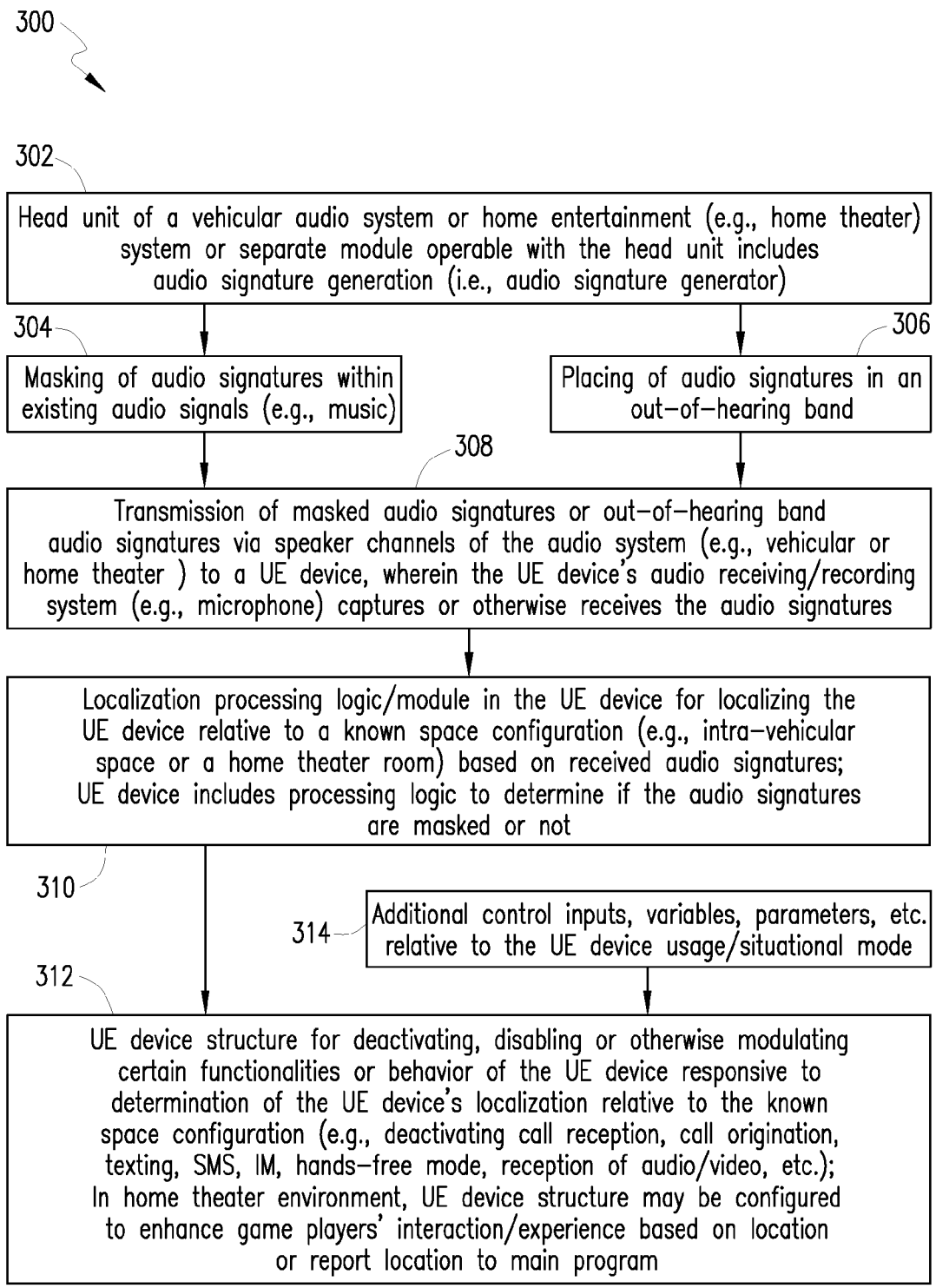
FIG. 3 depicts an exemplary functional block diagram involving various structural components for effectuating localization of a wireless UE device relative to a spatial configuration using audio ranging techniques according to one or more embodiments of the present patent application.

FIG. 3 depicts an exemplary functional block diagram 300 involving various structural components for effectuating localization of a wireless UE device relative to a spatial configuration using audio ranging techniques according to one or more embodiments of the present patent application. Block 302 refers to a head unit of a vehicular audio system or an entertainment system that includes the capability for generating or otherwise providing specific audio signature signals (i.e., audio signature generator) in accordance with one or more techniques as will be set forth below in additional detail. Those skilled in the art will recognize that "providing audio signature signals" could mean furnishing or supplying or preparing or controlling or otherwise making available the audio signature signals. The audio signature generator functionality may also be embodied in an independent unit, e.g., a preprocessing unit, that is interoperable with a conventional head unit (i.e., one that does not have audio signature generation capability for purposes of localizing a UE device) as a retro-fittable auxiliary module. In another embodiment, the audio signature generator functionality may be realized in software that can be downloaded or uploaded to a programmable head unit. At least two broad techniques may be utilized for providing the audio signature signals to a wireless UE device. Block 304 refers to one or more hardware/software/firmware components provided with the head unit for masking the audio signatures within one or more ongoing/existing background audio signals transmitted from the head unit. In general, background audio signals may comprise music (e.g., from AM/FM radio, satellite radio, CD player, tape player, MP3/digital music player, or playback through the vehicular/home entertainment audio system by any handheld device, etc.) or news (e.g., from AM/FM radio, satellite radio or a software radio of a handheld device played back through the vehicular/home entertainment audio system). The functionality embodied in block 304 may therefore be referred to as "audio masking approach". In the context of the present patent disclosure, audio masking or auditory masking refers to a class of techniques for hiding specific acoustic signals (which are otherwise audible) in a carrier audible signal such that they are rendered inaudible to humans. Audio masking is broadly based on the psychoacoustic principle that the perception of one sound may be affected by the presence of another sound. In the frequency domain, audio masking may be referred to as simultaneous masking, frequency masking, or spectral masking. In the time domain, audio masking may be referred to as temporal masking or non-simultaneous masking. In one or more embodiments described below, a set of pre-designed or preconfigured audio signatures are signal-processed (i.e., "mixed") into or onto an existing background acoustic signal such that the audio signatures are rendered imperceptible to human ears while played through a set of speakers.

Figure 16:
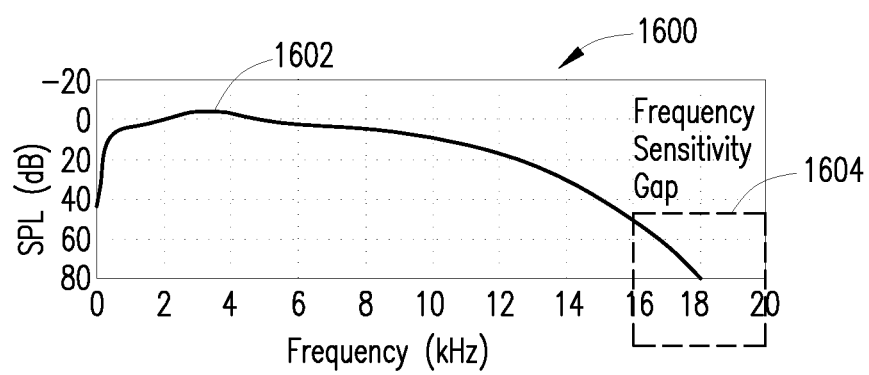
FIG. 16 illustrates a graphical representation of a frequency sensitivity gap between human auditory capability and a wireless UE device for placement of preconfigured audio signatures according to one or more embodiments of the present patent application.

Block 306 in FIG. 3 refers to one or more hardware/software/firmware components provided with the head unit for placing the audio signatures within an out-of-hearing band (i.e., "out-of-hearing band approach"). In the context of the present patent disclosure, this approach relies on certain observations regarding human hearing range and the operational range of a wireless UE device's microphone. As illustrated in FIG. 16, which shows a graph 1600 of absolute threshold of hearing (ATH) plotted as a Sound Pressure Level (SPL) curve 1602, there exists a frequency sensitivity gap 1604 between humans and wireless audio recording systems (i.e., a microphone), wherein the human hearing capacity rapidly shrinks beyond about 18 kHz. This threshold is further lowered for adults and older people. On the other hand, a wireless UE device can capture audio signals between 18 kHz and 20 kHz and beyond. In one or more embodiments described below, a set of pre-designed or preconfigured audio signatures may be placed in this frequency gap and transmitted from the head set even without any background acoustic signals (e.g., music) being played back.

Based on the foregoing, it should be appreciated that the service logic operating at the head unit (block 302) may include appropriate decision-making logic to determine whether a background audio signal is available for effectuating audio masking or not. If there is no background audio available, then processing relative to block 306 may take place. Block 308 refers to an audio transmission system associated with the head unit for transmitting one or more audio signature signals (either masked audio signatures or out-of-hearing band signatures) via the speaker channels of a vehicular or home entertainment system. Block 308 further refers to a wireless UE device's audio capturing/receiving system (e.g., a microphone) operable to receive, record or otherwise capture the audio signals from the speakers placed in a known spatial configuration.

Continuing to refer to FIG. 3, block 310 refers to one or more hardware/software/firmware components in a wireless UE device for effectuating audio ranging and localization processing/logic in the UE device based on the received audio signatures. In one implementation, the service logic operating at the UE device may further be augmented to include appropriate decision-making logic in order to determine whether the received audio signatures have been masked or not such that appropriate signal processing and decoding may take place. Responsive to localizing the UE device's position relative to a spatial configuration (e.g., a vehicular space or a home theater), one or more hardware/software/firmware components of the wireless UE device may be triggered for deactivating, disabling or otherwise modulating certain functionalities or behavioral aspects of the UE device as exemplified in block 312. Such deactivation or behavioral modulation may additionally, optionally or selectively be conditioned upon user input (e.g., via a keypad, touch screen, voice command input, etc.). In the context of a mobile communications device, various UE device features and functionalities may be deactivated, selectively or otherwise, including but not limited to call reception, call origination, SMS/IM texting, data communications such as email or file transfer, applications such as word processing, audio/video/camera operations as well streaming applications (e.g., music, video or other multimedia), voice command mode, hands-free mode, social media applications (e.g., Facebook, Tumblr, YouTube, Myspace, Twitter, LinkedIn, Renren, etc.), presence-based applications, and so on, especially for a UE device that has been determined to be localized within a "restricted area" or "prohibited zone" of the known spatial configuration such as the driver zone. It should be recognized that similar deactivation could also be implemented for the UE devices determined be localized in other areas as well. In a home theater environment, device structures relating to handheld game controllers may be configured to enhance game players' interaction/experience based on location thereof and/or report location to a gaming console's main program to potentially the behavior, functionality, and/or sequences of a game.

In a further embodiment, additional control inputs may be provided to interface with the deactivation/modulation logic of a wireless UE device, as exemplified in block 314. Such inputs may comprise, for example, vehicular sensory data (e.g., speed, fuel/gas information, engine status data, system alarms, idling status, etc.), road traction/conditions, traffic conditions, topographic data relative to the road being traversed (e.g., tunnels, mountainous terrain, bridges, and other obstacles, etc.), data relative to ambient weather conditions (visibility, rain, fog, time of day, etc.), location-based or zone restrictions (e.g., schools, hospitals, churches, etc.), as well as user biometric/sensory data (e.g., data indicating how alert the driver and/or passengers are, whether the driver/passenger is engaged in an activity that can cause distraction to the driver, etc.) and the UE device's usage/situational mode (i.e., the UE device has been turned off, or is on but only for data communications, or is in a purse, handbag, glove compartment, the pocket of an article of clothing, UE device's alarm/notification modes, etc.).

In an example implementation scenario, vehicle manufacturers (or third-party providers) may incorporate a standardized or standards-ready audio signature generation and transmission process into a vehicle's head unit, wherein the process may be executed in the background when the vehicle's ignition is turned on and the engine is running. Service logic executing on a wireless handheld UE device may include a localization process that is launched only when the vehicle is moving (e.g., at a threshold speed or beyond), or when a prohibited application is started, or both, and/or subject to any one of the conditionalities set forth above. The head unit's processing may be such that transmission of pre-designed/standardized audio signatures may run continuously in the background as long as the vehicle is turned on. Further, the head unit's processing logic may include the functionality to determine whether music or other audio signals are being played via the audio system (for using the audio masking approach) or not. Even where there is no music or other audio signals, the audio system may be placed in a "pseudo off" mode whereby out-of-hearing band audio signatures may still be generated and transmitted by the head unit.

For purposes of the present patent application, at least two techniques for designing and generating appropriate audio signature signals are disclosed, which will be described immediately hereinbelow.

A first audio signature design technique for purposes of device localization involves using one or more pseudo-random noise (PN) sequences for estimating a time delay when the PN sequences are received, recorded and processed by the UE device. A PN sequence's bit stream may have a spectrum similar to a random sequence of bits and may be deterministically generated with a periodicity. Such sequences may comprise maximal length sequences, Gold codes, Kasami codes, Barker codes, and the like, or any other PN code sequence that can be designed specifically for a particular vehicle, model, make or type. For localization purposes, one PN sequence for each speaker or channel may be assigned. When the PN sequences are transmitted by the head unit (either via audio masking or in an out-of-hearing band), the received signals are processed and a time delay is measured per each speaker channel, which may then be utilized for determining or estimating the positional placement of the wireless UE device relative to the spatial configuration associated with the speakers. A mathematical description of delay computation using PN sequences in an audio masking methodology for a two-channel example (i.e., left and right channels) is as follows:

Let $m_i(k)$, $s_i(k)$ denote respectively a background audio signal (e.g., music) and the PN sequence of channel i where i=1, 2 for left and right channels. From the standpoint of localization, it should be appreciated that the PN sequence is the "signal" whereas the music is "noise". Using the audio masking technique, the PN sequence can be hidden inside the music signal so that the signal coming out of a particular speaker is:

$$x_i(k) = m_i(k) + s_i(k).$$

If N is the length of the PN sequence, then $$s_i(k) = s_i(k+N).$$

Theoretically, the PN sequences have the following properties:

+A delta function for auto-correlation:

$$\sum_{k=1}^{N} s_i(k)s_i(k+l) = \delta(l) = \begin{cases} 0 & \text{if } l \neq 0 \\ 1 & \text{if } l = 0 \end{cases}$$

+Zero cross-correlation:

$$\sum_{k=1}^{N} s_i(k)s_j(k+l) = 0 \text{ for any } l \text{ and } i \neq j.$$

Without loss of generality, the signal (y) recorded by the UE device's microphone (i.e., a captured signal) in a two-channel system may be taken as the combination of two signals with different delays wherein w(k) is representative of ambient noise:

$$y(k) = x_1(k+d_1) + x_2(k+d_2) + w(k)$$

In cross-correlating with one of the PN sequences, we have:

$$\sum_{k=1}^{N} y(k)s_i(k+l) = \sum_{k=1}^{N} m_1(k+d_1)s_i(k+l) + s_1(k+d_1)s_i(k+l) + m_2(k+d_2)s_i(k+l) + s_2(k+d_2)s_i(k+l) + w(k)s_i(k+l)$$

The above sum of products can be separated into two sums of products, i.e., $$\Sigma_{k=1}^{N} s_1(k+d_1)s_i(k+l) + s_2(k+d_2)s_i(k+l) \text{ and}$$

$$\Sigma_{k=1}^{N} m_1(k+d_1)s_i(k+l) + m_2(k+d_2)s_i(k+l) + w(k)s_i(k+l).$$

Using the auto-correlation and cross-correlation properties of PN sequences, we have the first sum that equals $\delta(d_i-l)$. For the second sum, since the music signals are non-stationary and the noise is random and uncorrelated to the PN sequences, we can drive it to close to zero by averaging over multiple frames. So from the delta function $\delta(d_i-l)$, we can estimate the delay $d_i$ for each channel. In one embodiment, such delays may be compared against each other to detect the relative position of the UE device. In a two-channel environment, localization of the UE device may be coarse level, i.e., left side vs. right side of the spatial configuration. Additional embodiments may involve techniques such as triangulation, intersection of hyperboles, and the like, which in multi-channel environments may be used for finer level localization of the UE device. It should be appreciated that a receiver-side processing similar to the processing above may also be implemented for processing out-of-hearing band PN sequence audio signatures, mutatis mutandis.

Another audio signature design technique for purposes of device localization involves using power level data (e.g., dissipated power or power loss data) as a metric for estimating the relative position of a UE device. In this approach, a separate single-frequency tone (e.g., a beep or chirp) with the same power may be transmitted for each speaker channel. When the tones arrive at the UE device's microphone, a certain amount of power (or spectral energy) will have dissipated in proportion to the distances traversed by the tones from the speakers. As with the PN sequence approach, the single-frequency tones can be designed specifically for a particular vehicle, model, make or type, and may be masked in a background masker signal (e.g., music) or transmitted in an out-of-hearing band. A mathematical description of power dissipation methodology using single-frequency tones masked in each channel for a two-channel example (i.e., left and right channels) is set forth below:

Let $m_i(k)$, $s_i(k)$ denote respectively a background audio signal (e.g., a music signal) and the masked/embedded single-frequency tone in each channel. We therefore have an audio signal emanating from each speaker as:

$$x_i(k) = m_i(k) + s_i(k)$$

By applying a discrete Fourier Transform (DFT) onto a frame of length N, we obtain:

$$X_i(f) = M_i(f) + S_i(f)$$

where $S_i(f)=0$ for most of f except $f_1$ and $f_2$. In this case, $f_1$ and $f_2$ corresponds to the frequencies of the tones for a first channel (e.g., left channel) and a second channel (e.g., right channel), respectively. Appropriate phase and magnitude of the tones $\|S_1(f_1)\|$, $\|S_1(f_2)\|$, $\|S_2(f_1)\|$ and $\|S_2(f_2)\|$ may be selected such that the following conditions apply:

$$\|X_1(f_1)\| = \|X_2(f_2)\| \quad (1)$$

$$\|X_2(f_1)\| = \|X_1(f_2)\| = 0 \quad (2)$$

The Equation (2) means that the interference of one channel with respect to another at a specific frequency can be avoided. This can be achieved if the signals are designed to follow: $S_1(f_2) = -M_1(f_2)$ and $S_2(f_1) = -M_2(f_1)$. By experimental analysis, it has been found by the inventors of embodiments of this patent application that the distortion is inaudible if $f_1, f_2$ are selected in the low energy frequency range.

At the receiver side (i.e., the wireless UE device), we receive a captured signal as the sum of attenuated version of two signals:

$$Y(f) = \alpha_1 X_1(f) + \alpha_2 X_2(f)$$

where $\alpha_1$ and $\alpha_2$ are attenuation coefficients of the left and right channels, respectively. Heuristic detection rules may be based on the assumption that if the UE device is closer to the left speaker, then $\alpha_1 > \alpha_2$ and vice versa. In order to facilitate that determination, energy of the received signal Y(f) at two frequencies $f_1$ and $f_2$ may be compared as below based on Equation (1):

$$\|Y(f_1)\| \gtrless \|Y(f_2)\| \leftrightarrow \|\alpha_1 X_1(f_1) + \alpha_2 X_2(f_1)\| \gtrless \|\alpha_1 X_1(f_2) + \alpha_2 X_2(f_2)\| \leftrightarrow$$

$$\alpha_1 \|X_1(f_1)\| \gtrless \alpha_2 \|X_2(f_2)\| \leftrightarrow \alpha_1 \gtrless \alpha_2$$

In one practical implementation, the signature frames captured by the wireless UE's microphone may be stacked up (i.e., accumulated) in order to enhance the detection probability. Further, it should be appreciated that a receiver-side processing similar to the processing above may also be implemented for processing out-of-hearing band single-frequency tone audio signatures, mutatis mutandis.

In view of the two techniques for transporting the audio signatures and the two types of audio signatures described above, four different combinations may be obtained for implementing one or more embodiments of the present disclosure. In a still further variation, the single-frequency beeps/chirps may also be implemented, one beep per speaker channel, in an out-of-hearing band for measuring relative time delays with respect to a speaker configuration. The following Table summarizes these various embodiments wherein each embodiment includes appropriate signature signal generation capability at a head unit:

TABLE 1

| Exemplary Embodiments | Signal Design (Audio Signature) | Signal Transportation Technique/Feature |
|---|---|---|
| Embodiment 1 | PN sequence to measure delay offset | Audio masking using existing background audio signal (e.g., music) |
| Embodiment 2 | Tones to measure power loss or dissipation | Audio masking using existing background audio signal (e.g., music) |
| Embodiment 3 | PN sequence to measure delay offset | Out-of-hearing band but within the range of the UE device's microphone |
| Embodiment 4 | Tones to measure power loss or dissipation | Out-of-hearing band but within the range of the UE device's microphone |
| Embodiment 5 | One beep for each speaker channel to measure time delay (beeps generated by head unit without a round-trip) | Out-of-hearing band but within the range of the UE device's microphone |

Figure 4:
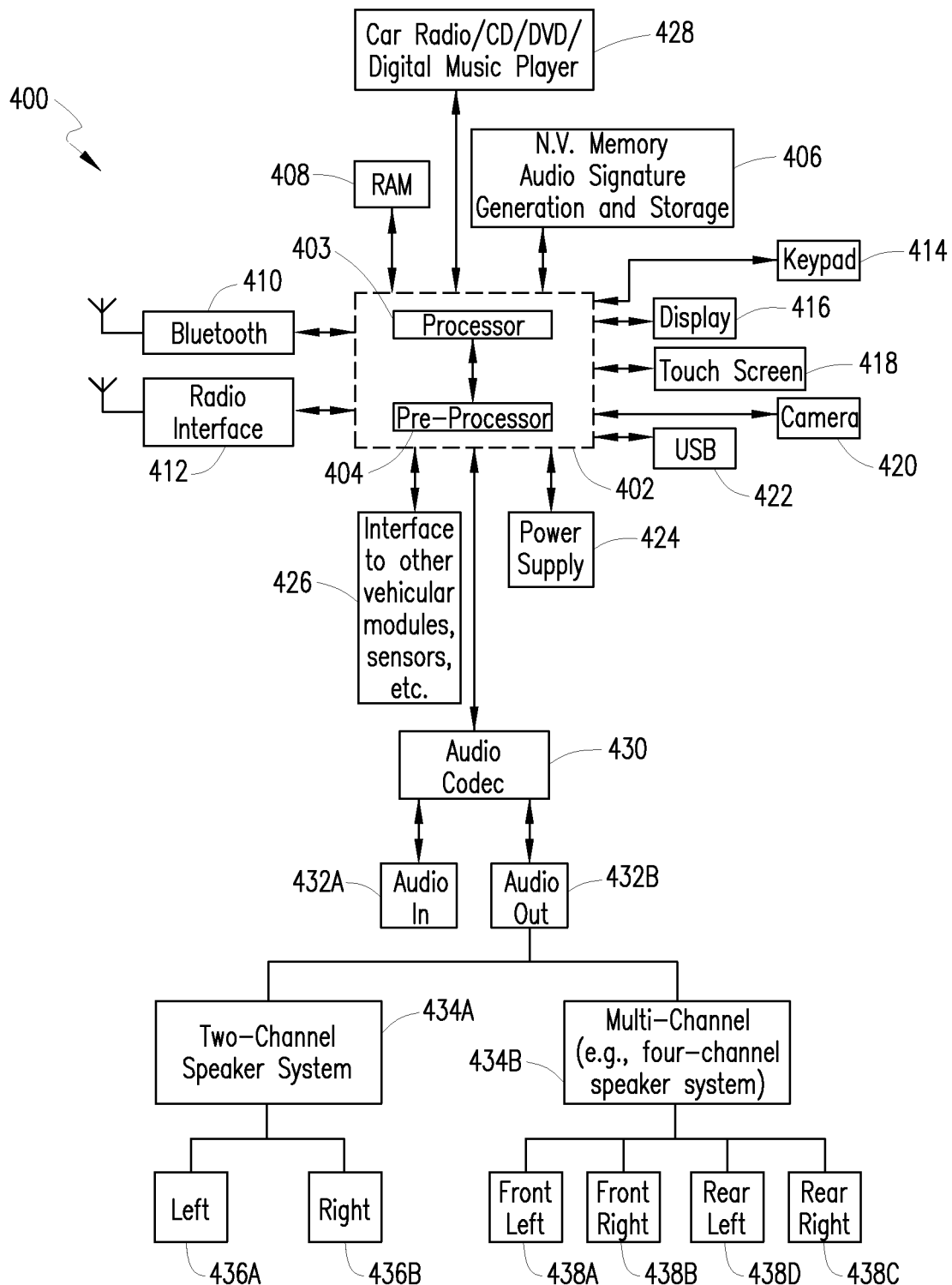
FIG. 4 depicts block diagram of an exemplary head unit having audio signature generation/storage functionality according to an embodiment.

Referring now to FIG. 4, depicted therein is a block diagram of an exemplary head unit 400 in association with an audio system, wherein head unit 400 may include audio signature generation functionality according to an embodiment. A processing complex 402 including a pre-processor 404 as well as processor 403 may be provided for the overall control of the head unit 400 that may be powered via power source(s) 424 such as a battery, line voltage, etc. A nonvolatile persistent memory block 406 may include appropriate logic, software or program code/instructions for audio signature generation using suitable signal processing circuitry such as DSPs and/or storage thereof for purposes of effectuating device localization. As alluded to previously, the audio signatures can be designed and/or standardized based on a vehicle's make, model and type (i.e., unique to each vehicle's model/type), and may be preprogrammed into nonvolatile memory 406 or downloaded or dynamically generated. Nonvolatile memory 406 may also include speaker configuration information and other data that may be transmitted as part of an encoded audio signal (e.g., audio watermarking), which may be decoded by a wireless UE device upon capture by the microphone. Processing complex 402 also interfaces with additional subsystems such as random access memory (RAM) 408, a Bluetooth interface 410 for facilitating Bluetooth communications, a radio interface 412 for facilitating cellular telecommunications and GPS navigation, keyboard 414, display 416, a resistive touch screen or touchpad 418, a camera interface 420, a USB interface 422, as well as appropriate interfaces 428 to a number of audio, video, TV, gaming and other entertainment components. In a vehicular implementation, head unit 400 may also include additional interfaces 426 with respect to various vehicular subsystems, modules, sensors, etc. An audio codec 430 may be provided for facilitating audio input 432A and audio output 432B. An audio transmission system may be interfaced to the audio output component 432B (wirelessly or via wired means) wherein a two-channel speaker system 434A having a left speaker 436A and a right speaker 436B or a multi-channel system 434B may be provided for delivering audio signals to the ambient space. An exemplary multi-channel system 434B may be coupled to a front left speaker assembly 438A, a front right speaker assembly 438B, a rear right speaker assembly 438C and a rear left speaker assembly 438D. In view of the foregoing, it should be appreciated that one or more hardware and/or software components (e.g., processors 403, 404, non-volatile memory 406 and audio components along with appropriate DSPs) may be arranged to operate as one or more means to provide or generate suitable audio signatures for purposes of the present patent application.

Figure 5:
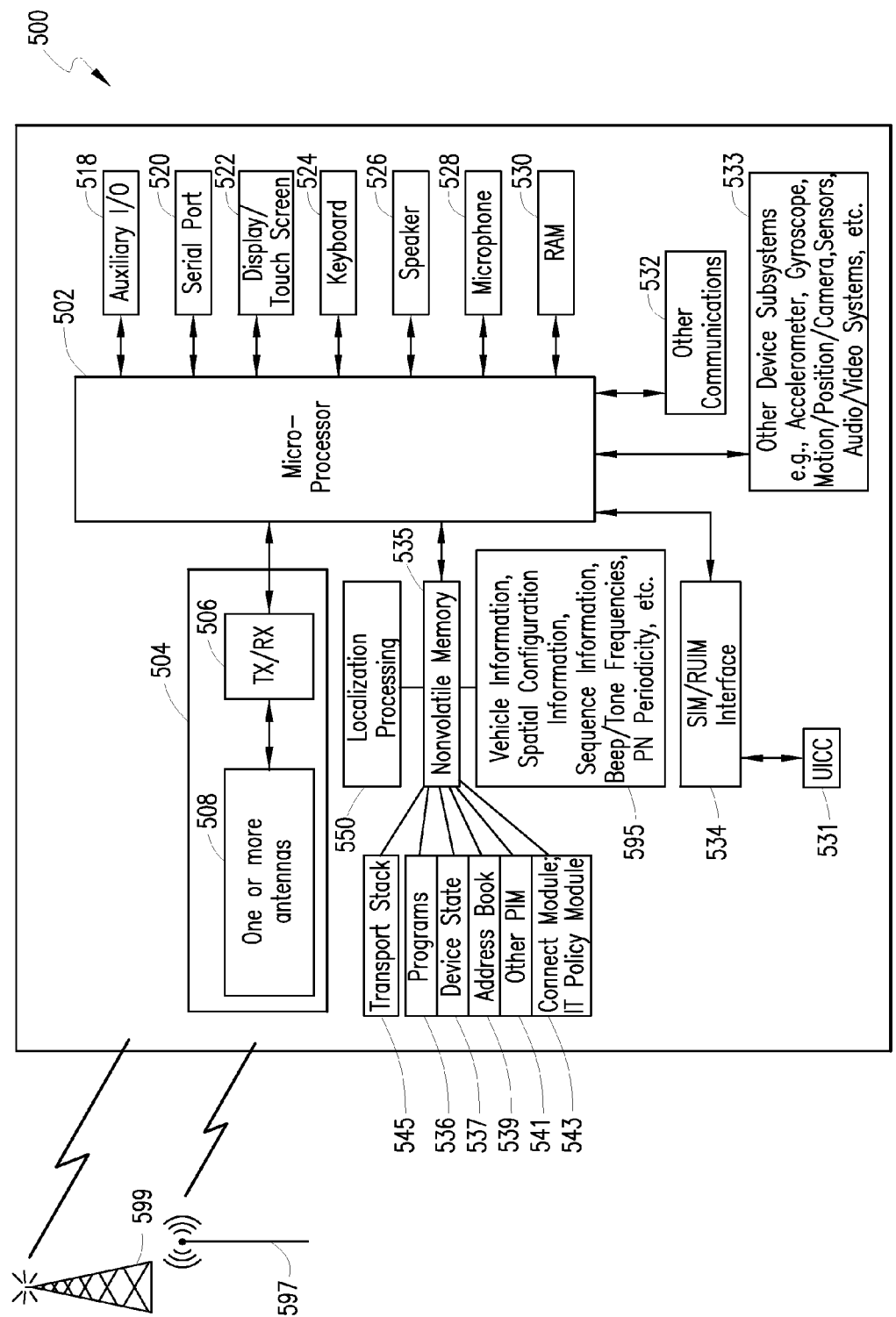
FIG. 5 depicts a block diagram of an example wireless UE device according to one embodiment of the present patent application.

FIG. 5 depicts a block diagram of an example wireless UE device 500 according to one embodiment of the present patent application. Wireless UE device 500 may be provided with a communication subsystem 504 that includes an antenna assembly 508 and suitable transceiver circuits 506. A microprocessor 502 providing for the overall control of the device 500 is operably coupled to the communication subsystem 504, which can operate with various access technologies, operating bands/frequencies and networks (for example, to effectuate multi-mode communications in voice, data, media, or any combination thereof). As will be apparent to those skilled in the field of communications, the particular design of the communication module 504 may be dependent upon the communications network(s) with which the device is intended to operate, e.g., as exemplified by cellular infrastructure elements 599 and WiFi infrastructure elements 597.

Microprocessor 502 also interfaces with additional device subsystems such as auxiliary input/output (I/O) 518, serial port 520, display/touch screen 522, keyboard 524 (which may be optional), speaker 526, microphone 528, random access memory (RAM) 530, other communications facilities 532, which may include for example a short-range communications subsystem (such as, for instance, Bluetooth connectivity to a head unit) and any other device subsystems generally labeled as reference numeral 533. Example additional device subsystems may include accelerometers, gyroscopes, motion sensors, temperature sensors, cameras, video recorders, pressure sensors, and the like, which may be configured to provide additional control inputs to device localization and deactivation logic. To support access as well as authentication and key generation, a SIM/USIM interface 534 (also generalized as a Removable User Identity Module (RUIM) interface) is also provided in one embodiment of the UE device 500, which interface is in a communication relationship with the microprocessor 502 and a Universal Integrated Circuit Card (UICC) 531 having suitable SIM/USIM applications.

Operating system software and other system software may be embodied in a persistent storage module 535 (i.e., non-volatile storage) which may be implemented using Flash memory or another appropriate memory. In one implementation, persistent storage module 535 may be segregated into different areas, e.g., transport stack 545, storage area for facilitating application programs 536 (e.g., email, SMS/IM, Telnet, FTP, multimedia, calendaring applications, Internet browser applications, social media applications, etc.), as well as data storage regions such as device state 537, address book 539, other personal information manager (PIM) data 541, and other data storage areas (for storing IT policies, for instance) generally labeled as reference numeral 543. Additionally, the persistent memory may include appropriate software/firmware (i.e., program code or instructions) 550 for effectuating one or more embodiments of audio signature processing, delay and power dissipation estimation, device localization, as well as suitable logic for deactivating one or more features/functions of the UE device 500. Nonvolatile memory 535 may also include a storage area 595 for storing vehicle information, speaker spatial configuration information, channel-specific PN sequence information, periodicity of PN sequences, length of PN sequences, beep/tone frequencies per channel, periodicity of masking tones, etc. The PN sequence information and single-frequency information may be standardized for a class of vehicles/models/types and may be programmed into the UE device 500 or may be downloaded. Powered components may receive power from any power source (not shown in FIG. 5). The power source may be, for example, a battery, but the power source may also include a connection to power source external to wireless UE device 500, such as a charger.

Where the wireless UE device 500 is embodied as a mobile communications device or cellular phone, the communication module 504 may be provided with one or more appropriate transceiver and antenna arrangements, each of which may be adapted to operate in a certain frequency band (i.e., operating frequency or wavelength) depending on the radio access technologies of the communications networks such as, without limitation, Global System for Mobile Communications (GSM) networks, Enhanced Data Rates for GSM Evolution (EDGE) networks, Integrated Digital Enhanced Networks (IDEN), Code Division Multiple Access (CDMA) networks, Universal Mobile Telecommunications System (UMTS) networks, any 2nd- 2.5- 3rd- or subsequent Generation networks, Long Term Evolution (LTE) networks, or wireless networks employing standards such as Institute of Electrical and Electronics Engineers (IEEE) standards, like IEEE 802.11a/b/g/n standards or other related standards such as HiperLan standard, HiperLan II standard, Wi-Max standard, OpenAir standard, and Bluetooth standard, as well as any satellite-based communications technology such as GPS. Accordingly, the wireless UE device 500 may operate as a smartphone in one or more modes, bands, or radio technologies, and may be adapted to communicate using circuit-switched networks (CSNs), packet-switched networks (PSNs), or a combination thereof.

Figure 6:
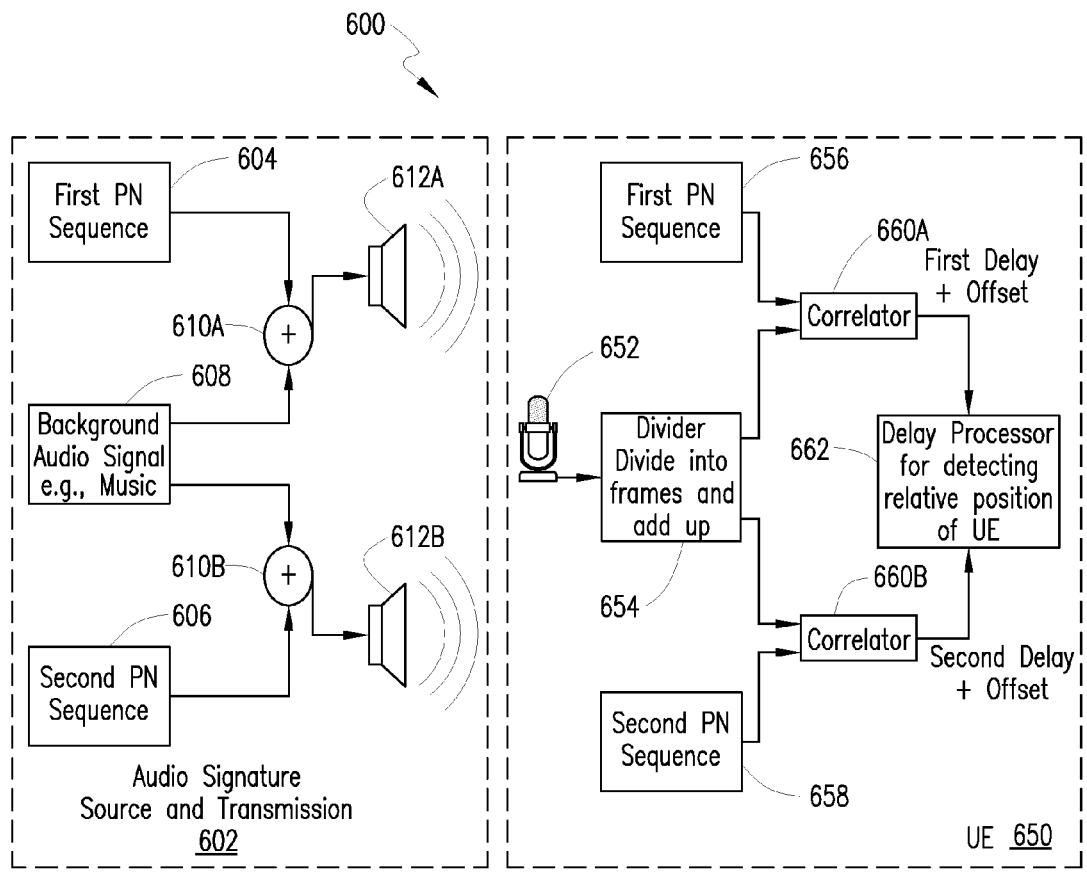
FIG. 6 depicts a block diagram of an audio ranging system for localization of a wireless UE device according to an embodiment of the present patent application.

FIG. 6 depicts a block diagram of an audio ranging system 600 for localization of a wireless UE device 650 according to an embodiment of the present patent application wherein masked PN sequences may be utilized. An audio signature source and transmission system 602 (e.g., that may be associated with a vehicular or home entertainment head unit) includes sources of multiple PN sequences, one per speaker channel, as exemplified by a first PN sequence 604 and a second PN sequence 606, which may be dynamically generated or preprogrammed into a nonvolatile memory. Accordingly, blocks 604, 606 may represent either PN generators or storage areas of the PN sequences. A background audio signal generator 608, e.g., a music source, generates a background audio signal to be used as a masker. Signal processing components 610A and 610B exemplify audio mask encoding and modulation blocks that each receive a channel-specific PN sequence signature and a masker channel for combining both into a compound audio signal. In one embodiment, components 610A and 610B are configured to compute how much energy can be inserted at a certain frequency band without audibly disturbing the channel component of the masker signal by using a suitable steganographic masking model. Accordingly, the PN sequences are inserted at appropriate points in the audible frequency range (covered by the music). It should be appreciated that although only two masking/modulation blocks 610A and 610B are depicted, a multi-channel system may have more than two such blocks depending on the number of channels.

Channel-specific encoded/masked PN sequences are provided to the respective speakers, e.g., speaker 612A (which may be a left speaker) and speaker 612B (which may be a right speaker) as part of the background masker audio signal. A microphone 652 of the UE device 650 captures/records the received audio signals including the masked PN sequences. A divide/add block 654 divides the received stream into frames of a length N, where N can be fixed and of equal length for all the frames. Further, N can be provided to be of the same length as the PN sequences' length. The frames are then added or summed up into a single frame. By segmenting and adding multiple frames, non-stationary background audio signal (e.g., music) and random background noise are suppressed while the fixed PN sequences are superimposed. A per-channel correlator correlates the single combined frame with the original channel-specific PN sequences 656, 658 to determine a delay and offset with respect to each speaker channel. In one embodiment, such original PN sequences may be stored locally in the UE device 650. In another embodiment, the original PN sequences may be dynamically downloaded to the UE device 650 from a network node. Correlators 660A and 660B are exemplary of a two-channel PN sequence processing provided in the UE device 650. A delay processor block 662 is operable to compare the relative delays for estimating the UE device's relative position.

Figure 7:
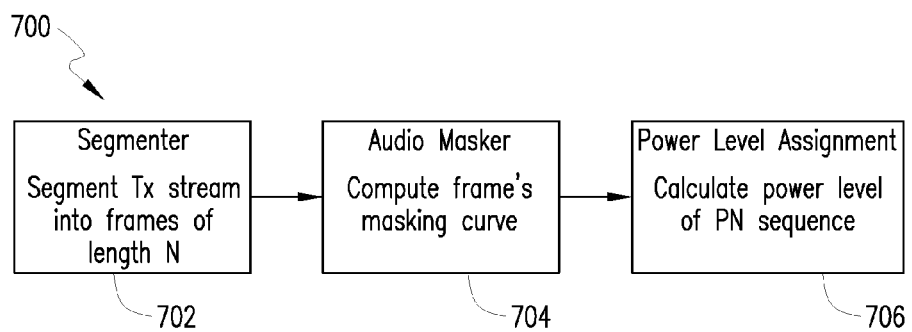
FIG. 7 depicts an exemplary functional block diagram involving various structural components associated with an audio signature generator embodiment operable with the audio ranging system of FIG. 6.

FIG. 7 depicts an exemplary functional block diagram 700 involving various structural components associated with a channel-specific masker encoder component operable as a signal processing component of the audio signature generator 602 of FIG. 6. A segmenter block 702 segments the background music signal into frames of a specific length (e.g., N bits), which may also be the length of the PN sequence. A maximum permissible distortion energy (i.e., masking threshold) may be computed by an audio masker block 704 with respect to each frame to cover the PN sequence, which gives rise to what is called a masking curve for that frame. A power level assignment block or component 706 is configured to assign appropriate power levels to the PN sequence such that the inserted power at the PN sequence's frequency range does not exceed the masking curve limit.

Figure 8:
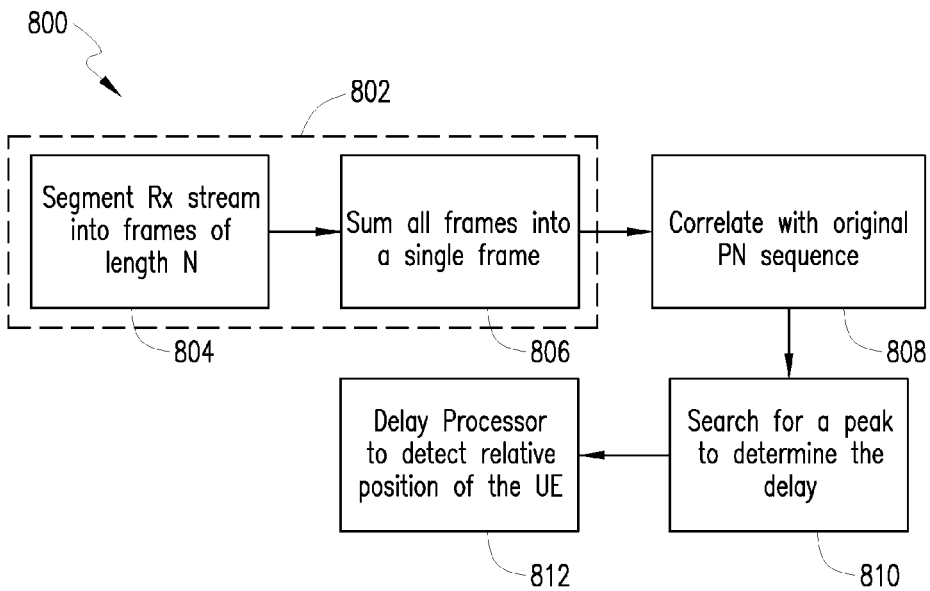
FIG. 8 an exemplary functional block diagram involving various structural components associated with a wireless UE device operable with the audio ranging system of FIG. 6.

FIG. 8 depicts an exemplary functional block diagram 800 involving various structural components in additional detail for decoding the received PN sequences at the UE device 650 operable with the audio ranging system of FIG. 6. A processing block 802 is representative of divider/adder block 654, wherein a segmenter 804 segments the combined audio signal received/recorded at the microphone into frames of length of N. As described above, an adder 806 is configured to sum the frames into a single frame that is correlated with the original PN sequences (on a channel by channel basis) (correlator block 808). Since the background audio signals (e.g., music) are transmitted at higher power than the PN sequences, multiple segments of the signal may need to be accumulated so that the music signal can be averaged out while the signal-to-noise ratio (SNR) of the PN sequences increases with each addition. Because the received PN sequences are time-shifted with respect to the original PN sequences, a peak may be determined in the correlation output, as provided in a peak determination block 810. A delay processor 812 is operable as a localization estimator for comparing delays to determine relative position of the UE device (coarse level estimation) or for performing more complex algorithms or processes (e.g., triangulation) to obtain finer level estimates of the relative positioning of the UE device.

Figure 9:
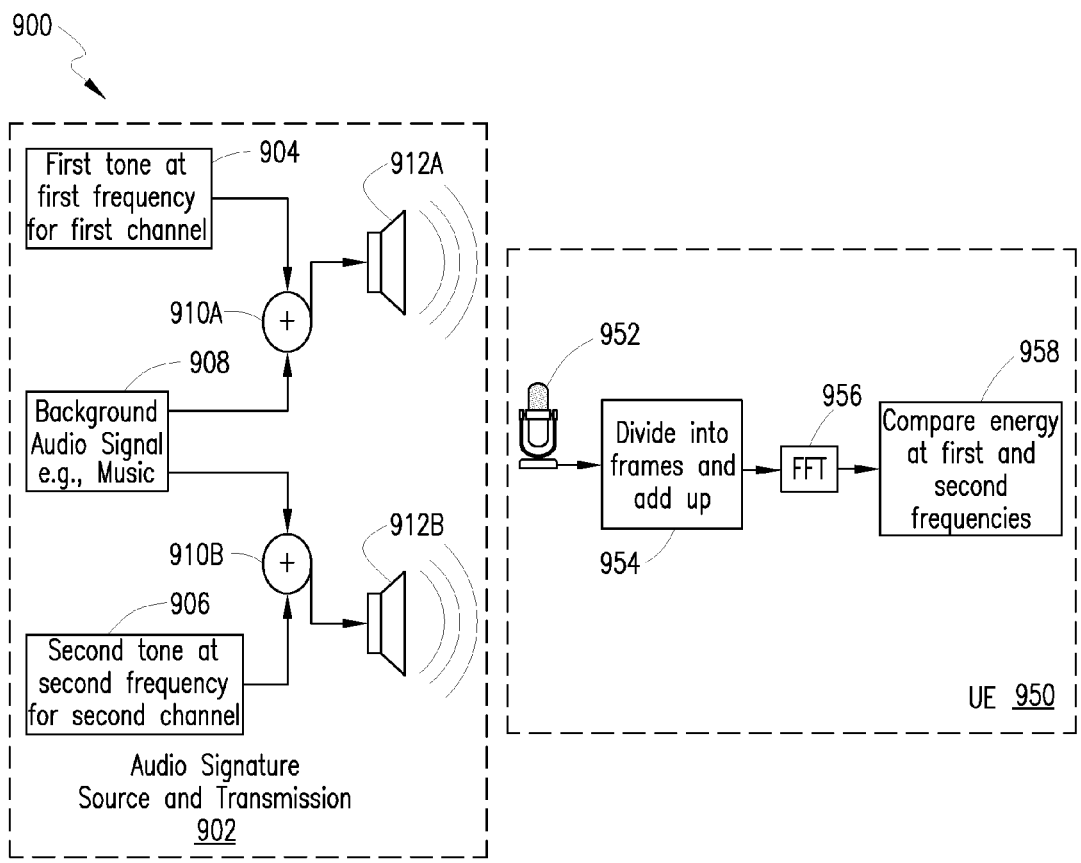
FIG. 9 depicts a block diagram of an audio ranging system for localization of a wireless UE device according to another embodiment of the present patent application.

FIG. 9 depicts a block diagram of an audio ranging system 900 for localization of a wireless UE device 950 according to an embodiment of the present patent application wherein masked single-frequency tone signatures may be utilized. Similar to the embodiment shown in FIG. 6, an audio signature source and transmission system 902 (e.g., that may be associated with a vehicular or home entertainment head unit) includes sources of single-frequency tones, one per speaker channel, as exemplified by a first tone 904 and a second tone 906, which may be dynamically generated or programmed into a nonvolatile memory. Accordingly, blocks 904, 906 may represent either tone generators or storage areas of the single-frequency tones. A background audio signal generator 908, e.g., a music source, generates a background audio signal operable as a masker. Signal processing components 910A and 910B exemplify audio mask encoding and modulation blocks that each receive a channel-specific single-frequency tone and a masker channel for combining both into a compound audio signal. Similar to the embodiment of FIG. 6, components 910A and 910B are configured to compute a suitable masking curve by using appropriate steganographic masking models. Again, it should be appreciated that although only two masking/modulation blocks 910A and 910B are depicted with respect to a two-channel system, a multi-channel system may have more than two such blocks depending on the number of channels. Furthermore, since the masking/encoding processes set forth in the embodiments of FIGS. 6 and 9 can be effectuated in respective software implementations, such processes may be integrated into a single functional/structural module as well in yet another embodiment.

Channel-specific encoded/masked single-frequency tones are provided along with the carrier background audio signals to the respective speakers, e.g., first speaker 912A (which may be a left speaker) and second speaker 912B (which may be a right speaker). A microphone 952 of UE device 950 captures/records the received audio signals including the masked single-frequency tones. A divide/add block 954 divides the received stream into frames of equal length, which are added or summed up into a single frame. A Fast Fourier Transform (FFT) block 956 performs Fourier analysis on the single frame, the output of which is provided to a energy comparator and localization estimator 958 that is operable to compare the dissipated energies at the two frequency tones for estimating the UE device's relative position.

Figure 10:
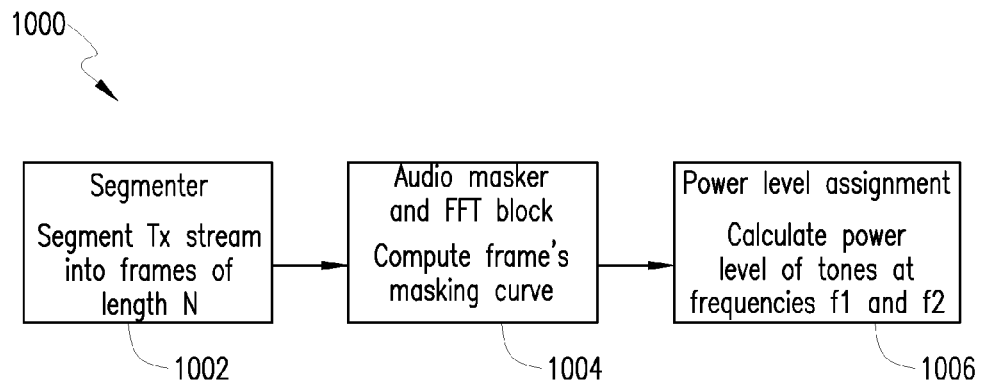
FIG. 10 depicts an exemplary functional block diagram involving various structural components associated with an audio signature generator embodiment operable with the audio ranging system of FIG. 9.

FIG. 10 depicts an exemplary functional block diagram 1000 involving various structural components associated with a channel-specific masker encoder component operable as a signal processing component of the audio signature generator 902 of FIG. 9. A segmenter block 1002 segments the background music signal into frames of a specific length (e.g., N bits). A maximum permissible distortion energy (i.e., masking threshold) may be computed by an audio masker and FFT block 1004 with respect to each frame, which gives rise to what is called a masking curve for that frame. A power level assignment block 1006 is configured to assign appropriate power levels to the embedded tones at frequencies, e.g., $f_1$ and $f_2$, such that Equations (1) and (2) of the mathematical analysis set forth in the foregoing sections are satisfied.

Figure 11:
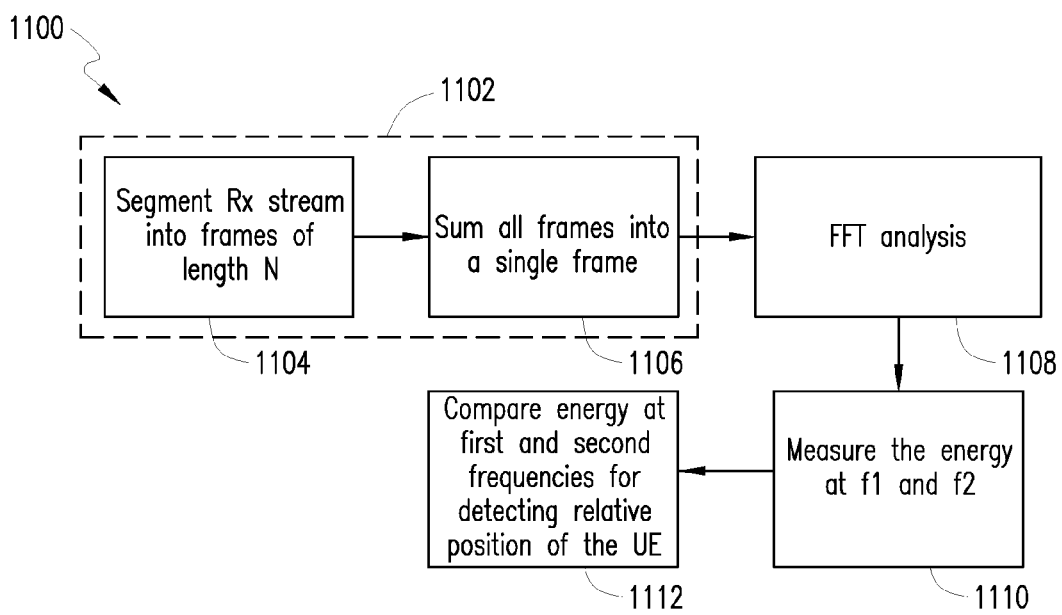
FIG. 11 an exemplary functional block diagram involving various structural components associated with a wireless UE device operable with the audio ranging system of FIG. 9.

FIG. 11 depicts an exemplary functional block diagram 1100 involving various structural components in additional detail for decoding the received single-frequency tones at the UE device 950 operable with the audio ranging system of FIG. 9. A processing block 1102 is representative of divider/adder block 954, wherein a segmenter 1104 segments the combined audio signal received/recorded at the microphone into frames of length of N. As described above, an adder 1106 is configured to sum the frames into a single frame. As before, multiple segments of the signal may be accumulated so that SNR at the relevant frequencies is boosted over the background music signal. An FFT block 1108 is configured to apply Fourier analysis with respect to the summed frame to analyze the power level of the tones. A measurement block 1110 is configured to measure the energy (or relatedly, power level) at the relevant frequency tones, the output of which is provided to a localization estimator 1112 for comparing the energy levels (relatedly, power dissipation levels and/or time delays based thereon) in order to determine a relative position of the UE device (either coarse level estimation for two-channel systems or fine level estimation for multi-channel systems) with respect to a spatial configuration.

As described hereinabove, the audio signatures such as PN sequences or single-frequency tones may also be transmitted in suitable out-of-hearing bands, which may be captured by a wireless UE device and analyzed for relative delay estimation or estimation of power dissipation. Such estimations may then be utilized for purposes of localization estimation as described in the foregoing sections. Accordingly, audio signature sources similar to the audio signature sources 602, 902 described above may be provided in such an implementation wherein the additional signal processing needed for audio masking may be inactivated (e.g., based a determination that there is no background music in the vehicle), as will be described in detail below in reference to FIGS. 17 and 18. In such a scenario, signal processing components 610A/610B and 910A/910B may comprise functionality to inject the audio signatures (i.e., PN sequences or single-frequency tones) into specific speaker channels at a suitable out-of-hearing frequency range (without masking). Such out-of-hearing frequency ranges may be channel-specific, dynamically/periodically or adaptively configurable (by user or by vehicle manufacturer), and/or specific to a vehicle model/make/type. In a corresponding fashion, the UE devices 650, 950 may also include appropriate decision-making logic in a persistent storage module to determine if the captured audio signatures are in an out-of-hearing band without a masking signal, and thereby apply a localization scheme in accordance with one or more embodiments set forth herein without having to invoke the signal processing relative to audio masking. It should be realized that although there is no music signal or other audio signal selected by a user (e.g., a driver or a passenger in a vehicle), because of the pseudo off mode operation of the head unit, the audio transmission system associated with the head unit can still carry an audio signal (although not audible to the humans), which may be captured along with any ambient noise by the UE's microphone. Accordingly, such signals may be processed at the receiver side in one embodiment similar to the signal processing and decoding processes described above.

Figure 12:
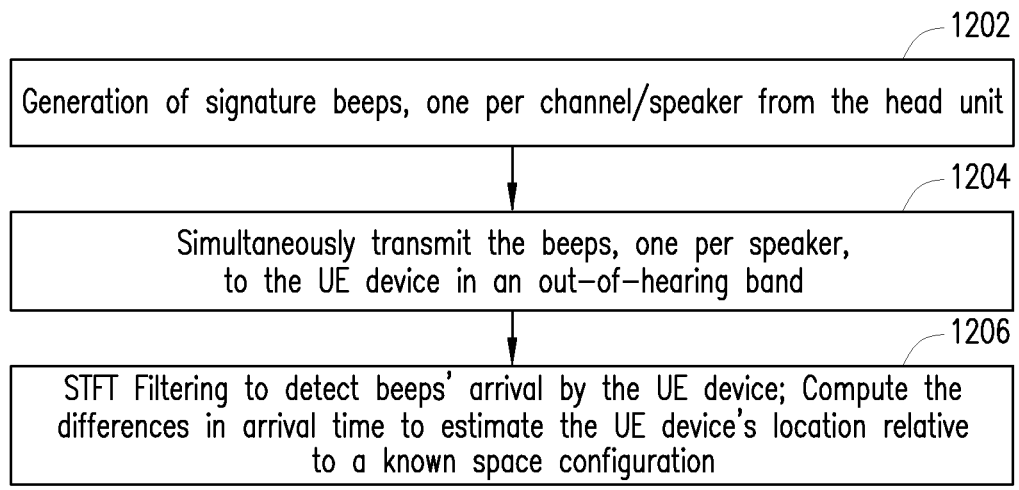
FIG. 12 depicts an exemplary functional block diagram involving various structural components for effectuating localization of a wireless UE device relative to a spatial configuration using audio ranging techniques according to another embodiment of the present patent application.

In a still further embodiment (e.g., Embodiment 5 of Table 1 set forth hereinabove), a chirp generator associated with a head unit may generate beeps or chirps that may be provided to a wireless UE device for localization estimation. In such a scenario, the head unit provides the necessary audio signatures (i.e., beeps) without receiving any beeps generated by the wireless UE device and transmitted to the head set via a local connection, e.g., Bluetooth connection, for a round-trip playback of the same. In one configuration, accordingly, the beeps may be provided to the UE device without a request therefor from the UE device. In another configuration, beep generation may be triggered responsive to user sensory data, a command from the UE device or a network node, etc. FIG. 12 depicts an exemplary functional block diagram 1200 involving various structural components for effectuating localization of a wireless UE device relative to a spatial configuration in such an embodiment. Block 1202 is representative of a head unit chirp/beep generator configured to generate beeps (e.g., high frequency beeps or sinusoids in the 18 kHz to 20 kHz range that are robustly resistant to ambient noise such as engine noise, road/tire noise as well as conversation) that may be sent out on each channel at a certain periodicity. The beeps may be simultaneously transmitted, one beep per speaker, using an audio transmission system 1204 in an out-of-hearing band to a UE device disposed relative to a plurality of speakers in arranged in a particular configuration. Receiver side processing 1206 of a wireless UE device is configured to perform appropriate signal processing including, e.g., detecting the beeps' arrival using Short-Time Fourier Transform (STFT) filtering, sampling, band-pass filtering, etc. Differences in the arrival times may be used for relative ranging and subsequent localization of the UE device.

It should be recognized by one skilled in the art that in one implementation of the foregoing technique, the beeps may be specifically designed for each speaker channel of the audio system. The individual beeps may be relatively short in time and have a unique spectrum so that they can be detected separately at the UE device. For example, in one implementation, the beeps can be designed to be relatively short in time while having a distinguishable spectrum. Whereas such beeps can be generated in the head unit at different times, they are transmitted simultaneously to the UE device such that relative differences in the arrival times may be computed for audio ranging. That is, instead of sending a single beep sequentially to each speaker, a separate tone to each speaker is sent out simultaneously, which are recorded by the UE device's microphone. The arrival time of each beep may be detected using STFT analysis, and since the beeps are transmitted at the same time from the head unit, the delay differences in the sound traveling from each speaker to the UE device represent the actual arrival time differences. In other words, the differences in the delays (reflecting the distance the beeps travel from the speakers to the UE device) are equivalent to the differences in arrival times of the beeps detected by the UE device (detected by performing the STFT analysis in one implementation). Such time delays may be utilized for localization purposes as set forth below.

Figure 13:
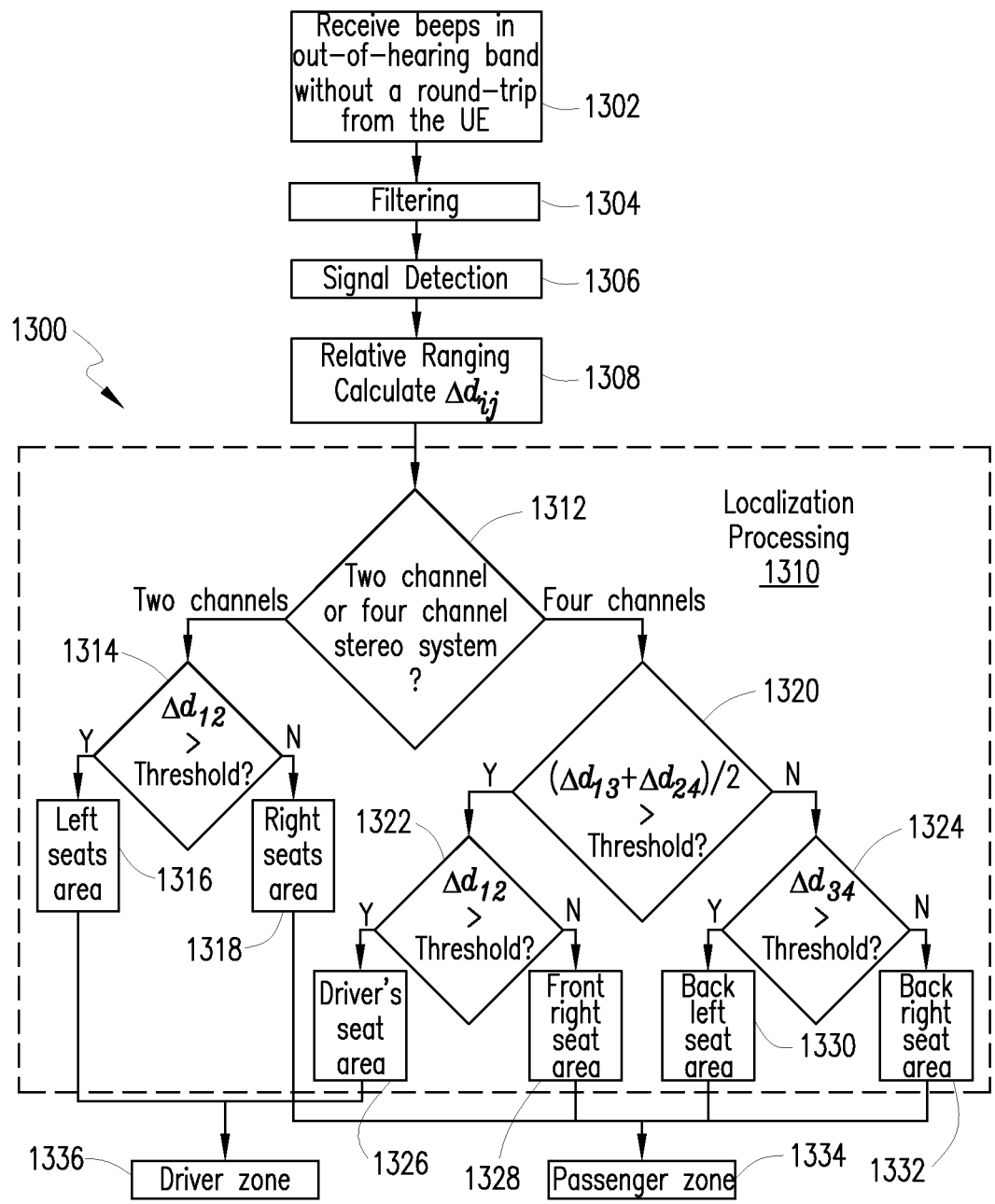
FIG. 13 depicts a flowchart of exemplary localization processing at a wireless UE device operable with one or more embodiments of the present patent application.

FIG. 13 depicts a flowchart of exemplary localization processing 1300 at a wireless UE device operable with one or more embodiments of the present patent application set forth above. At block 1302, out-of-hearing band beeps or other audio signatures are received and recorded as a captured signal at the wireless UE device, which are then processed and filtered (block 1304). A signal detector (block 1306) then detects the beeps based on such techniques as change-point detection (i.e., identifying the first arriving beep signal that deviates from "noise") coupled with application of suitable thresholds and moving windows (to reduce false detection). A relative ranging block 1308 is operable to compute and compare various delays ($\Delta d_{ij}$) relative to one another. Based on the various delays ($\Delta d_{ij}$), a localization process 1310 may estimate the relative positioning of the UE device as follows. First, a determination may be made as to whether the beeps are received via a two-channel or four-channel audio system (block 1312). If a two-channel system is employed, a comparison is made if the relative delay ($\Delta d_{12}$) is greater than a threshold (block 1314). If so, a determination may be made (block 1316) that the UE device is localized within a first portion of a spatial configuration (e.g., left-hand seating area of a vehicle, which may include a driver area in one convention). Otherwise, a determination may be made (block 1318) that the UE device is localized in a second portion of the spatial configuration (e.g., right-hand seating area of the vehicle, which may not include a driver zone in one convention).

If a four-channel audio system is being employed (block 1312), a determination is made (block 1320) for comparing a ratio associated with the relative delay between channel 1 and channel 3 ($\Delta d_{13}$) and the relative delay between channel 2 and channel 4 ($\Delta d_{24}$) against a threshold. If the ratio is greater than the threshold, a further determination is made whether the relative delay associated with channels 1 and 2 ($\Delta d_{12}$) is greater than a threshold (block 1322). If so, a determination may be made (block 1326) that the UE device is localized within a first portion of a spatial configuration (e.g., front left seating area of a vehicle, which may correspond to the driver seating area in one convention). Otherwise, a determination may be made (block 1328) that the UE device is localized in a second portion of the spatial configuration (e.g., front right seating area of the vehicle, which may correspond to a front passenger seating area according to one convention).

If the ratio determined at block 1320 is not greater than a threshold, a further determination is made whether the relative delay associated with channels 3 and 4 ($\Delta d_{34}$) is greater than a threshold (block 1324). If so, a determination may be made (block 1330) that the UE device is localized within a third portion of the spatial configuration (e.g., back left seating area of a vehicle, corresponding to a passenger seating area). Otherwise, a determination may be made (block 1332) that the UE device is localized in a fourth portion of the spatial configuration (e.g., back right seating area of the vehicle, corresponding to another passenger seating area).

Those skilled in that art should recognize that the various thresholds set forth above can be varied based on a vehicle's make, model, type, etc. Further, the localization determinations of the foregoing process may be augmented with additional probabilistic estimates and device usage/situational mode determinations. Based on the driving conventions (which may be country-dependent and/or region-specific), some of the areas (either in a two-channel environment or in a four-channel environment) may be designated together as a "prohibited" driver zone as shown in block 1336 or a "permissive" passenger zone as shown in block 1334. Furthermore, one or more embodiments of the above localization processing techniques may be used in connection with time delays determined in a received PN sequence signature or with delays based on power loss determinations of received single-tone signatures.

Figure 14A:
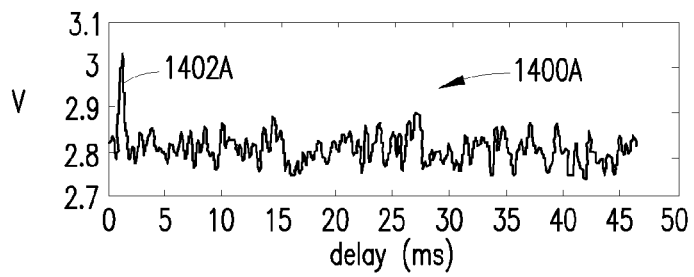
FIGS. 14A and 14B illustrate graphical representations of simulation or experimental data associated with an embodiment of the audio ranging system of FIG. 6.
Figure 14B:
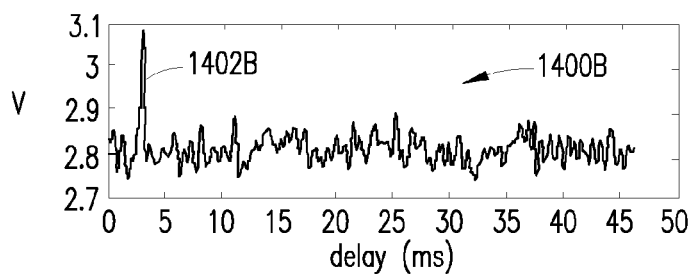

FIGS. 14A and 14B illustrate graphical representations of simulation or experimental data associated with an embodiment of the audio ranging system of FIG. 6. In particular, reference numeral 1400A generally refers to a simulation of cross-correlation relative to a first PN sequence and a combined signal received at a wireless UE device via a first channel (e.g., on a left channel). Using a sampling frequency of 44.1 kHz and a PN sequence modulated around 11.025 kHz, a spike 1402A is detected that is indicative that the wireless UE device is located near (or, in the vicinity of) a left-side speaker. Reference numeral 1400B generally refers to a simulation of cross-correlation relative to a PN sequence and a combined signal received at a wireless UE device via a second channel (e.g., on a right channel). Again, using a sampling frequency of 44.1 kHz and a PN sequence modulated around 11.025 kHz, a spike 1402B is obtained that is indicative that the wireless UE device is located near (or, in the vicinity of) a right-side speaker. It should be appreciated that the peaks 1402A and 1402B indicate the delay time for the audio signature signals traveling from the speakers to the wireless UE device, plus the synchronization offset between the head unit and the UE device. Because the offset is relative and may be normalized, absolute synchronization may not be required between the head unit and the wireless UE device as to when the audio signature transmission commences in one embodiment.

Figure 15A:
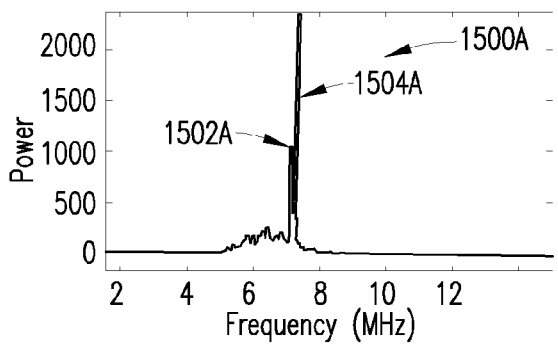
FIGS. 15A and 15B illustrate graphical representations of simulation or experimental data associated with an embodiment of the audio ranging system of FIG. 9.
Figure 15B:
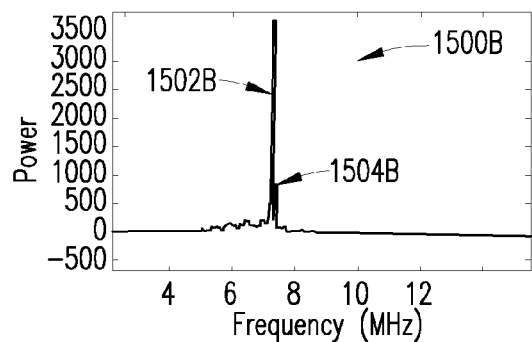

FIGS. 15A and 15B illustrate graphical representations of simulation or experimental data associated with an embodiment of the audio ranging system of FIG. 9. In particular, reference numeral 1500A generally refers to an FFT analysis of a combined signal received at a wireless UE device that includes two masked single-frequency tones on two channels in an experiment. After filtering the signal around the tone frequencies and performing the FFT analysis, two peaks 1502A and 1504A are obtained as shown in FIG. 15A, which are indicative of the power difference (in appropriate units) between the two tones (one received on one channel and the other received on the other channel). Peak 1502A is much more attenuated compared to peak 1504A, indicating that the wireless UE device is closer to (or, in the vicinity of) a first speaker (e.g., a left-side speaker) rather than a second speaker (e.g., a right-side speaker). In contrast, FIG. 15B shows two peaks 1502B and 1504B which indicate that the wireless UE device is closer to the second speaker (e.g., the right-side speaker).

Figure 17:
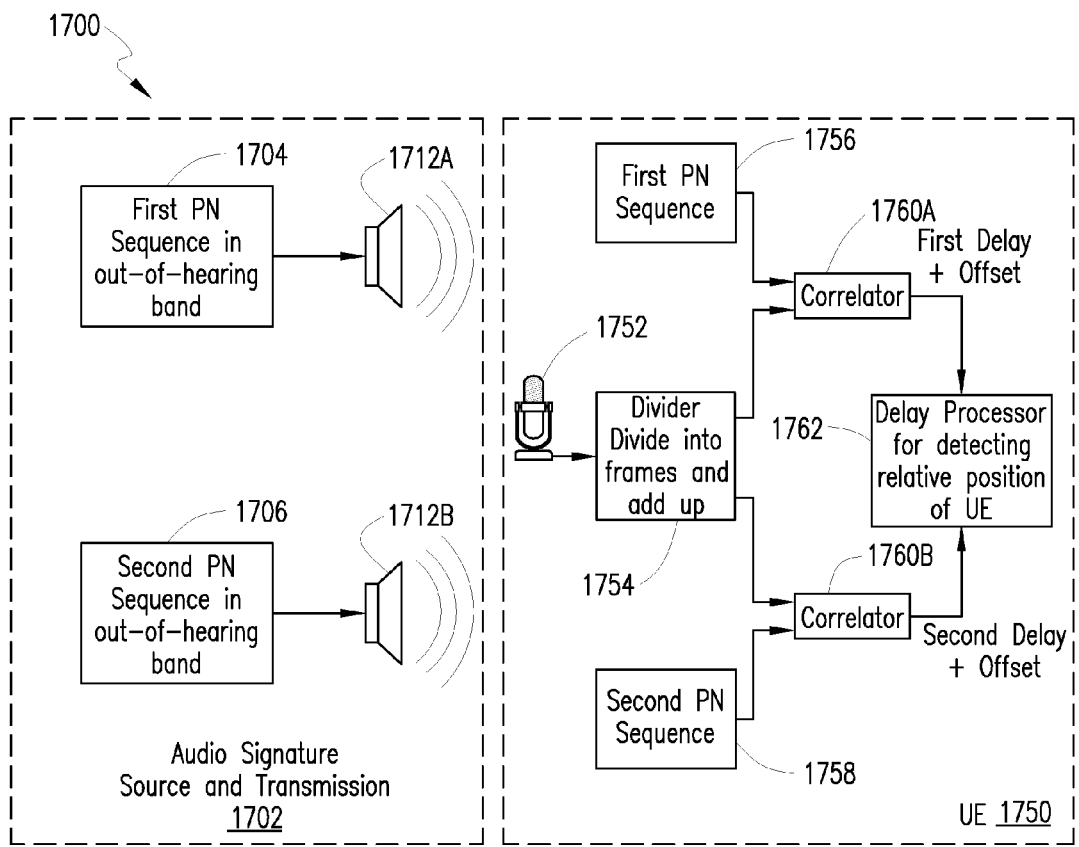
FIG. 17 depicts a block diagram of an audio ranging system for localization of a wireless UE device according to yet another embodiment of the present patent application.

FIG. 17 depicts a block diagram of an audio ranging system 1700 for localization of a wireless UE device 1750 according to yet another embodiment of the present patent application wherein PN sequence audio signatures may be used in an out-of-hearing band. Similar to the embodiment of FIG. 6, blocks 1704, 1706 may represent either PN generators or storage areas of a number of PN sequences to be used as audio signatures in an out-of-hearing band from an audio signature source and transmission apparatus 1702 associated with a head unit. As there is no background audio signal for carrying the signatures, accordingly, a first PN sequence 1704 may be placed in one out-of-hearing band by means of appropriate intermediary signal processing circuitry or directly injected into audio output components coupled to drive a corresponding speaker. Likewise, a second PN sequence 1706 may be placed in a second out-of-hearing band by appropriate intermediary signal processing circuitry or directly injected into audio output components coupled to drive a corresponding speaker. As before, although a two-speaker system exemplified by speakers 1712A and 1712B is illustrated in FIG. 17, it should be realized that there could be more than two speaker channels. It should be further recognized that the PN sequences may be placed in the same out-of-hearing band (since such signatures are provided separately to the corresponding speakers) or in different out-of-hearing bands.

As to the receiving side, a signal decoding and processing logic similar to the embodiments shown in FIG. 6 and FIG. 8 with respect to UE 650 may be utilized here as well. Accordingly, microphone 1752 of UE device 1750 is operable to record or otherwise capture the out-of-hearing band PN sequences emanating from the respective speakers, along with any ambient noise, which together may comprise a captured/recorded signal stream in the out-of-hearing band and may be processed in similar fashion. A divide/add block 1754 is configured to divide the recorded signal stream into frames of a length N, where N can be fixed and of equal length for all the frames. As before, N can be provided to be of the same length as the PN sequences' length. The frames may then be added or summed up into a single frame for purposes of noise suppression and boosting the signatures' signal. A per-channel correlator correlates the single combined frame with the original channel-specific PN sequences 1756, 1758 to determine a delay and offset with respect to each speaker channel. As before, such original PN sequences may be stored locally in the UE device 1750 in one implementation. In another variation, the original PN sequences may be dynamically downloaded to the UE device 1750 from a network node. Correlators 1760A and 1760B are exemplary of a two-channel PN sequence processing provided in the UE device 1750. A delay processor block 1762 is operable to process the relative delays for estimating the UE device's relative position using, e.g., a localization technique such as block 1310 described above.

Figure 18:
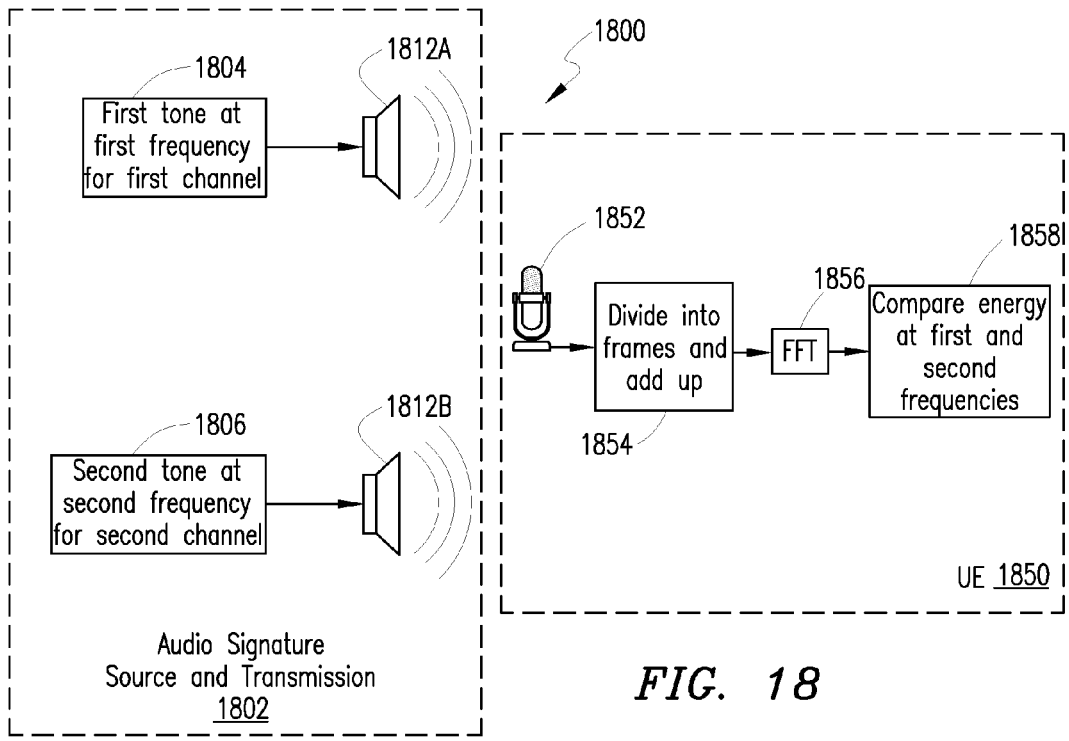
FIG. 18 depicts a block diagram of an audio ranging system for localization of a wireless UE device according to another embodiment of the present patent application.

FIG. 18 depicts a block diagram of an audio ranging system 1800 for localization of a wireless UE device 1850 according to a still further embodiment of the present patent application wherein single-frequency tone signatures may be used in an out-of-hearing band. Similar to the embodiment of FIG. 9, an audio signature source and transmission system 1802 (e.g., that may be associated with a vehicular or home entertainment head unit) includes sources of single-frequency tones, one per speaker channel, as exemplified by a first tone 1804 and a second tone 1806, which may be dynamically generated or programmed into a nonvolatile memory. Accordingly, blocks 1804, 1806 may represent either tone generators or storage areas of the single-frequency tones which may be placed in respective out-of-hearing bands in an example two-speaker system represented by speakers 1812A and 1812B, with similar intermediary signal processing or otherwise as set forth above in reference to FIG. 17, mutatis mutandis. Likewise, it should be realized that the single-frequency tones may be placed in the same out-of-hearing band or in different out-of-hearing bands on a channel by channel basis.

As to the receiving side, a signal decoding and processing logic similar to the embodiments shown in FIG. 9 and FIG. 11 with respect to UE 950 may be utilized here as well. A microphone 1852 of UE device 1850 is operable to record or otherwise capture the out-of-hearing band single-frequency tones emanating from the respective speakers, along with any ambient and/or residual noise, which together may comprise a captured/recorded signal stream in the out-of-hearing band and may be processed in similar fashion. A divide/add block 1854 may be configured to divide the recorded signal stream into frames of equal length, which are added or summed up into a single frame. An FFT block 1856 performs Fourier analysis on the single frame, the output of which is provided to a energy comparator and localization estimator 1858 that is operable to compare the dissipated energies at the two frequency tones or time delays based thereon for estimating the UE device's relative position, using a localization technique such as block 1310 described above in one example.

Figure 19:
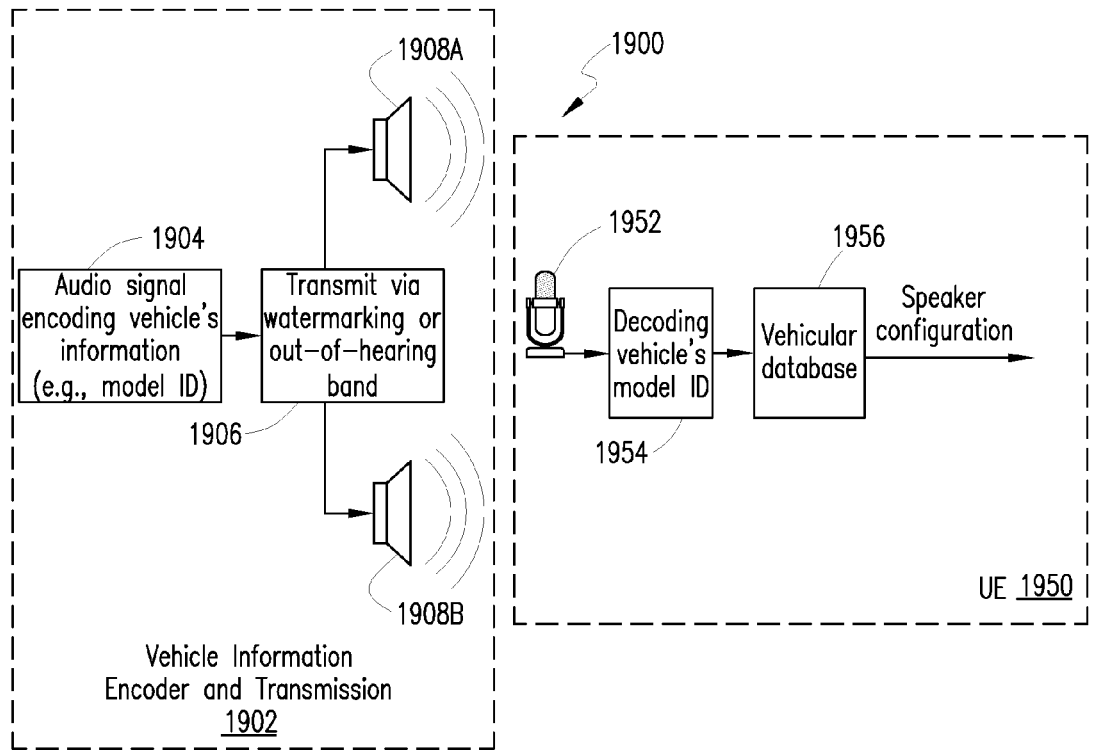
FIG. 19 depicts a block diagram of a system for effectuating transmission of vehicular information to a wireless UE device according to an embodiment of the present patent application.

It should be appreciated that one or more device localization schemes set forth hereinabove may involve the knowledge of a vehicle's speaker configuration from the perspective of a wireless UE device. In one example implementation, such information may be extracted from a database provided with the UE device if the vehicle's information is made available. As alluded to previously, a vehicle's information may comprise information at various levels of granularity, e.g., model ID, make/type, vehicle trim line, Vehicle Identification Number or VIN, etc. that may be used for correlating with a particular speaker configuration. FIG. 19 depicts a block diagram of a system for effectuating transmission of vehicular information to a wireless UE device according to an embodiment of the present patent application. Apparatus 1902 is operable with a vehicle's head unit wherein a vehicle information encoder 1904 is configured to encode an audio signal with appropriate vehicular information (e.g. model ID, and so on). A transmitter block 1906 is operable to transmit the encoded vehicle information signal using an audio watermarking technique or in an out-of-hearing band. In other words, the encoded signal can be rendered hidden inside a background audio signal using a watermarking technique in addition to or separate from the generation and transmission of masked audio signatures described previously. Example audio watermarking techniques may comprise schemes such as quantization schemes, spread-spectrum schemes, two-set schemes, replica schemes, and self-marking schemes. Regardless of whether an audio watermarking scheme or an out-of-hearing band scheme is used, the encoded vehicular information signal is provided to an audio system exemplified by speakers 1908A, 1908B, which may then be recorded or otherwise captured by microphone 1952 of a UE device 1950. A suitable decoder 1954 of UE 1950 is adapted to decode the vehicular information, which may then be correlated with a vehicular database 1956 (e.g., a lookup table) that is either locally stored (e.g., preloaded) or disposed on a network node and downloaded as needed. After extracting a speaker configuration responsive to querying the database, the speaker configuration information may be provided as an input to the localization logic executing on the device. It will be recognized that the concept of transmitting encoded vehicular information is independent of any device localization schemes set forth above although it may be practiced in conjunction with one or more device localization embodiments as described elsewhere in the present patent application.

Figure 20:
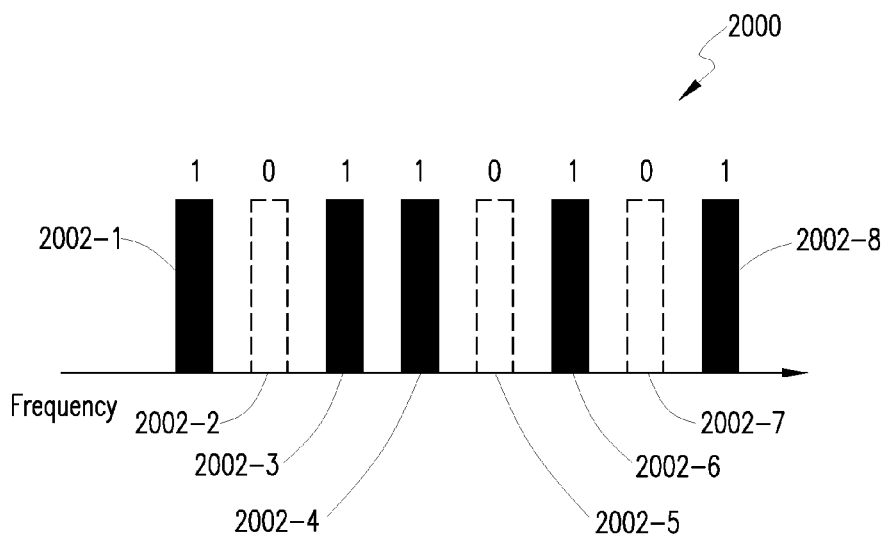
FIG. 20 depicts an example of encoded vehicular information for transmission to a wireless UE device of FIG. 19 according to an embodiment of the present patent application.

FIG. 20 depicts an example of encoded vehicular information 2000 for transmission to a wireless UE device (e.g., UE 1950 of FIG. 19) using an out-of-hearing band scheme according to an embodiment of the present patent application. The exemplary vehicular information 2000 is comprised of 8 bits (reference numerals 2002-1 through 2002-8) that are encoded on an out-of-hearing band carrier signal wherein each information bit may be represented by the presence or absence of a tone at a certain frequency. By way of illustration, reference numeral 2002-1 represents a "1" bit, indicating a tone at a particular out-of-hearing band frequency. Likewise, reference numeral 2002-2 represents a "0" bit, indicating the absence of a tone in the band of interest. Upon receipt, decoder 1954 of the wireless UE device 1950 may perform a suitable spectrum analysis to decode the 8-bit information for subsequent database query and localization processing.

Those skilled in the art will appreciate that the embodiments set forth herein provide a number of device localization solutions that may be advantageously implemented in vehicular applications whereby certain device usage features and functionalities may be deactivated or otherwise modulated (selectively or otherwise) so that driver distraction due to device usage may be reduced. Unlike certain known solutions, there is no limitation on the number of UE devices whose relative localizations may be determined in accordance with the teachings of the present patent disclosure. Additionally, because the audio signature generation can be standardized and implemented at the head unit, proactive user compliance may not be necessary, thereby reducing any potential opportunity for intentionally defeating the localization process by a user while driving.

Various processes, structures, components and functions set forth above in detail, associated with one or more embodiments of a head unit or a wireless UE device, may be embodied in software, firmware, hardware, or in any combination thereof, and may accordingly comprise suitable computer-implemented methods or systems for purposes of the present disclosure. Where the processes are embodied in software, such software may comprise program instructions that form a computer program product, instructions on a non-transitory computer-accessible media, uploadable service application software, or software downloadable from a remote station or service provider, and the like. Further, where the processes, data structures, or both, are stored in computer accessible storage, such storage may include semiconductor memory, internal and external computer storage media and encompasses, but is not limited to, nonvolatile media, volatile media, and transmission media. Nonvolatile media may include CD-ROMs, magnetic tapes, PROMs, Flash memory, or optical media. Volatile media may include dynamic memory, caches, RAMs, etc. In one embodiment, transmission media may include carrier waves or other signal-bearing media. As used herein, the phrase "computer-accessible medium" encompasses "computer-readable medium" as well as "computer executable medium."

It is believed that the operation and construction of the embodiments of the present patent application will be apparent from the Detailed Description set forth above. While example embodiments have been shown and described, it should be readily understood that various changes and modifications could be made therein without departing from the scope of the present disclosure as set forth in the following claims.

What is claimed is:

1. A method operating on a wireless user equipment (UE) device, said method comprising:
   receiving a plurality of audio signatures from a head unit via an audio system having a plurality of speaker channels,
   wherein said plurality of audio signatures are masked within an audible background audio signal received from said head unit and recorded by a microphone of said wireless UE device;
   receiving an encoded vehicle information signal from said head unit via at least one of said plurality of speaker channels;
   decoding said encoded vehicle information signal to obtain an identity of a vehicle in which said head unit is implemented;
   correlating said identity with a database to determine a particular spatial configuration;
   processing said plurality of audio signatures, by processor of said wireless UE device configured to operate in association with one or more subsystems of said wireless UE device, for determining said wireless UE device's location relative to the particular spatial configuration associated with the interior of a vehicle or a room; and
   when said wireless UE device is determined to be located within a restricted zone of the particular spatial configuration, modifying a functional aspect of said wireless UE device.

2. The method of claim 1 wherein said plurality of audio signatures comprises a plurality of pseudorandom noise (PN) sequences, each corresponding to a speaker channel of said plurality of speaker channels.

3. The method of claim 2 wherein said processing comprises:
   segmenting said background audio signal including masked PN sequences into a plurality of frames, each frame having a length;
   summing said plurality of frames to form a single combined frame;
   correlating said single combined frame with original PN sequences corresponding to said speaker channels to determine a delay associated with each speaker channel, whereby a plurality of said delays are determined corresponding to said plurality of speaker channels; and
   estimating said wireless UE device's location based on said plurality of said delays relative to said particular spatial configuration.

4. The method of claim 3 wherein said original PN sequences are stored in a persistent memory module in said wireless UE device.

5. The method of claim 3 wherein said length is equal to a length of said masked PN sequences.

6. The method of claim 1 wherein said plurality of audio signatures comprises a plurality of single-frequency tones, each corresponding to a speaker channel of said plurality of speaker channels.

7. The method of claim 6 wherein said processing comprises:
   segmenting said background audio signal including masked single-frequency tones into a plurality of frames, each frame having a length;
   summing said plurality of frames to form a single combined frame;
   performing a Fourier Transform analysis on said single combined frame and measuring an energy level at each of said masked single-frequency tones; and
   estimating said wireless UE device's location based on said energy levels relative to said particular spatial configuration.

8. The method of claim 1 wherein said functional aspect of said wireless UE device comprises at least one of call reception, call origination, Short Message Service (SMS) texting, Instant Messaging (IM), a data application, an email application, a word processing application, a camera application, a presence application, gaming application, a music playback application, a video playback application, a social media application, a voice command mode, and a hands-free mode.

9. A wireless user equipment (UE) device comprising:
   a processor configured to control one or more subsystems of said wireless UE device;
   a microphone; and
   a persistent memory module having program instructions which, when executed by said processor, are configured to perform:
   facilitating reception of a plurality of audio signatures from a head unit via an audio system having a plurality of speaker channels, wherein said plurality of audio signatures are masked within an audible background audio signal from said head unit and recorded by the microphone;
   decoding an encoded vehicle information signal received from said head unit to obtain an identity of vehicle in which said head unit is implemented, wherein said encoded vehicle information signal is received via at least one of said plurality of speaker channels;
   correlating said identity with a database to determine a particular spatial configuration;
   processing said plurality of audio signatures, by the processor operating in association with one or more of the subsystems of the wireless UE device, for determining said wireless UE device's location relative to the particular spatial configuration associated with the interior of a vehicle or a room; and when
   said wireless UE device is determined to be located within a restricted zone of the particular spatial configuration, modifying a functional aspect of said wireless UE device.

10. The wireless UE device of claim 9 wherein said plurality of audio signatures comprises a plurality of pseudorandom noise (PN) sequences, each corresponding to a speaker channel of said plurality of speaker channels.

11. The wireless UE device of claim 9 wherein said plurality of audio signatures comprise a plurality of single-frequency tones, each corresponding to a speaker channel of said plurality of speaker channels.

12. The wireless UE device of claim 9 wherein said functional aspect of said wireless UE device comprises at least one of call reception, call origination, Short Message Service (SMS) texting, Instant Messaging (IM), a data application, an email application, a presence application, a word processing application, a camera application, a gaming application, a music playback application, a video playback application, a social media application, a voice command mode, and a hands-free mode.

* * * * *